United States Patent
Nakashima et al.

(10) Patent No.: US 10,277,313 B2
(45) Date of Patent: Apr. 30, 2019

(54) TRANSMISSION APPARATUS, TRANSMISSION SYSTEM, AND TRANSMISSION CONTROL METHOD

(71) Applicant: FUJITSU LIMITED, Kawasaki-shi, Kanagawa (JP)

(72) Inventors: Hisao Nakashima, Kawasaki (JP); Takeshi Hoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 23 days.

(21) Appl. No.: 15/403,589

(22) Filed: Jan. 11, 2017

(65) Prior Publication Data

US 2017/0222716 A1 Aug. 3, 2017

(30) Foreign Application Priority Data

Jan. 28, 2016 (JP) .................. 2016-014904

(51) Int. Cl.
*H04B 10/25* (2013.01)
*H04J 14/02* (2006.01)
*H04B 10/079* (2013.01)

(52) U.S. Cl.
CPC ......... *H04B 10/0795* (2013.01); *H04B 10/25* (2013.01); *H04J 14/0298* (2013.01)

(58) Field of Classification Search
CPC ................. H04B 10/0795; H04J 14/0298
See application file for complete search history.

(56) References Cited

U.S. PATENT DOCUMENTS

| 2012/0141130 A1 | 6/2012 | Nakashima et al. |
| 2013/0071122 A1* | 3/2013 | Sasaki .................. H04B 10/66 398/79 |
| 2014/0314415 A1* | 10/2014 | Vassilieva ........... H04J 14/0227 398/76 |

(Continued)

FOREIGN PATENT DOCUMENTS

| JP | 2012-23607 | 2/2012 |
| JP | 2012-120010 | 6/2012 |
| WO | WO2015/022034 A1 * | 2/2015 ........... H04B 10/572 |

OTHER PUBLICATIONS

Tomofumi Oyama et al., "Complexity Reduction of Perturbation-based Nonlinear Compensator by Sub-band Processing", Optical Society of America, OFC, 2015.

(Continued)

*Primary Examiner* — Casey L Kretzer
(74) *Attorney, Agent, or Firm* — Staas & Halsey LLP

(57) ABSTRACT

There is provided a transmission apparatus configured to receive a frequency-division multiplexed optical signal generated by modulating carrier light based on a plurality of frequency-division multiplexed subcarrier signals, the transmission apparatus including: a processor configured to: extract a plurality of subcarrier signals of the plurality of frequency-division multiplexed subcarrier signals from the frequency-division multiplexed optical signal; calculate signal qualities of the plurality of subcarrier signals; detect a deviation of the signal qualities between the plurality of subcarrier signals; and perform a frequency control of the carrier light generated by an optical source of a transmission apparatus configured to transmit the frequency-division multiplexed optical signal, based on the deviation of the signal qualities.

17 Claims, 20 Drawing Sheets

(56) References Cited

U.S. PATENT DOCUMENTS

2016/0142150 A1* 5/2016 Lyubomirsky ...... H04J 14/0221
398/182
2016/0191195 A1* 6/2016 Magri .................... H04J 14/02
398/79

OTHER PUBLICATIONS

Meng Qiu et al., "Subcarrier Multiplexing Using DACs for Fiber Nonlinearity Mitigation in Coherent Optical Communication Systems", Optical Society of America, OFC, 2014.
Gabriella Bosco et al., "On the Performance of Nyquist-WDM Terabit Superchannels Based on PM-BPSK, PM-QPSK, PM-8QAM or PM-16QAM Subcarriers", Journal of Lightwave Technology, vol. 29, No. 1, Jan. 1, 2011, pp. 53-61.

* cited by examiner

FIG.18

| SIGNAL QUALITY (C(i)) | SN RATIO/TRANSMISSION POSSIBILITY / IMPOSSIBILITY (OK/NG) | | |
|---|---|---|---|
| | MULTI-VALUE LEVEL:2 | MULTI-VALUE LEVEL:3 | MULTI-VALUE LEVEL:4 |
| 16 | 18/OK | 22/OK | 24/OK |
| 14 | 16/OK | 20/OK | 22/OK |
| 12 | 14/OK | 18/OK | 20/OK |
| 10 | 12/OK | 16/OK | 18/OK |
| 8 | 10/NG | 14/NG | 16/NG |
| 6 | 8/NG | 12/NG | 14/NG |

TRANSMISSION APPARATUS, TRANSMISSION SYSTEM, AND TRANSMISSION CONTROL METHOD

CROSS-REFERENCE TO RELATED APPLICATION

This application is based upon and claims the benefit of priority of the prior Japanese Patent Application No. 2016-014904, filed on Jan. 28, 2016, the entire contents of which are incorporated herein by reference.

FIELD

The embodiments discussed herein are related to a transmission apparatus, a transmission system, and a transmission control method.

BACKGROUND

As a technique for mass data transmission, wavelength division multiplexing (WDM) for multiplexing and transmitting a plurality of optical signals having different wavelengths is known (see, e.g., Japanese Laid-Open Patent Publication No. 2012-023607). In addition, for example, orthogonal frequency-division multiplexing (OFDM) for multiplexing a plurality of subcarrier signals where different data are superimposed with high density by means of a digital signal processing (see, e.g., Japanese Laid-Open Patent Publication No. 2012-120010) and a modulation technique for frequency-multiplexing using a Nyquist filter for squaring a spectral waveform (see, e.g., Non-Patent Documents 1 and 2) are also known.

Since an optical signal modulated with a signal having the spectral waveform squared by the OFDM and the Nyquist filter may reduce an occupied bandwidth of the optical signal, an optical transmission system capable of ultra-high density multiplexing with a wavelength-multiplexed optical signal wavelength spacing reduced to a level of a symbol rate has been researched and developed (see, e.g., Non-Patent Document 3).

Related technologies are disclosed in, for example, Japanese Laid-Open Patent Publication Nos. 2012-023607 and 2012-120010.

Related technologies are disclosed in, Tomofumi Oyama et al, "Complexity Reduction of Perturbation-based Nonlinear Compensator by Sub-band Processing," OFC2015, Th3D (Non-Patent Document 1), Meng Qiu et al, "Subcarrier Multiplexing Using DACs for Fiber Nonlinearity Mitigation in Coherent Optical Communication Systems," OFC2014, Tu3J (Non-Patent Document 2), and Gabriella Bosco, et al, "On the Performance of Nyquist-WDM Terabit Superchannels Based on PM-BPSK, PM-QPSK, PM-8QAM or PM-16QAM Subcarriers," JOURNAL OF LIGHTWAVE TECHNOLOGY, VOL. 29, NO. 1, pp. 53-61, January, 2011 (Non-Patent Document 3).

SUMMARY

According to an aspect of the invention, a transmission apparatus is configured to receive a frequency-division multiplexed optical signal generated by modulating carrier light based on a plurality of frequency-division multiplexed subcarrier signals, the transmission apparatus includes: a processor configured to: extract a plurality of subcarrier signals of the plurality of frequency-division multiplexed subcarrier signals from the frequency-division multiplexed optical signal; calculate signal qualities of the plurality of subcarrier signals; detect a deviation of the signal qualities between the plurality of subcarrier signals; and perform a frequency control of the carrier light generated by an optical source of a transmission apparatus configured to transmit the frequency-division multiplexed optical signal, based on the deviation of the signal qualities.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 18 is a view illustrating an example of a transmission characteristic table;

DESCRIPTION OF EMBODIMENTS

The center frequency of a wavelength-multiplexed optical signal is determined based on an optical frequency of a light source used in a transmitter. A proper control is required for the optical frequency since the optical frequency varies within a range of several GHz due to a deterioration of the transmitter by aging or the wavelength dependency of the transmitter.

The frequency control is performed to optimize spacing between adjacent frequency-division multiplexed optical signals. The optimal frequency spacing depends on, for example, narrowing of a band by an optical filter arranged in the middle of a transmission line, a linear crosstalk between wavelength-multiplexed optical signals, and a non-linear crosstalk between wavelength-multiplexed optical signals due to the Kerr effect which occurs in an optical fiber.

However, since these factors vary depending on the traffics on the transmission line and operational conditions of a network, a frequency control is required to be performed in accordance with the conditions of the transmission line. In contrast, for example, it may be considered to monitor frequency spacing between adjacent wavelength-multiplexed optical signals by using a high resolution optical spectrum analyzer, and collect the monitoring results and the operational conditions of traffic information/network in order to calculate the optimal frequency spacing based on the information. However, this increases apparatus costs and complicates a control system.

Hereinafter, embodiments of a technique capable of providing a transmission apparatus, a transmission system, and a transmission control method with improved transmission characteristics will be described with reference to the accompanying drawings.

Figure 1:
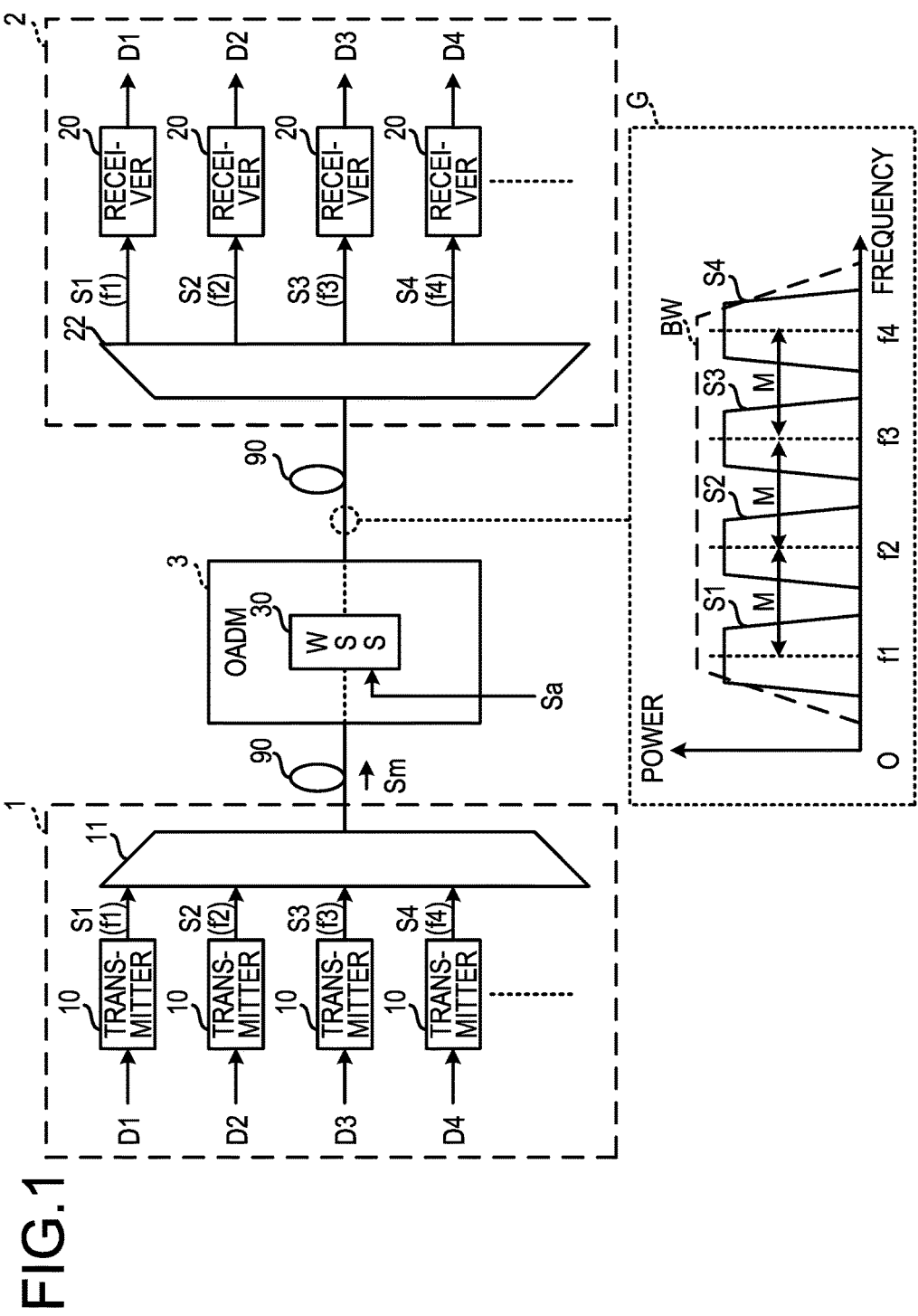
FIG. 1 is a view illustrating an exemplary configuration of a transmission system.

FIG. 1 is a view illustrating an exemplary configuration of a transmission system. The transmission system includes a transmitting side transmission apparatus 1, a receiving side transmission apparatus 2, and an optical add and drop multiplexer (OADM) 3 connected between the transmission apparatuses 1 and 2. The transmission apparatuses 1 and 2 and the OADM 3 are interconnected by an optical fiber 90 serving as a transmission line. The symbol G denotes an example of a spectral waveform of a WDM signal Sm transmitted to the optical fiber 90.

The transmission apparatus 1 is an example of a first transmission apparatus and includes a plurality of transmitters 10 and a multiplexer 11. Electrical data signals D1 to D4 are input to the plurality of transmitters 10, respectively, from a network at a user side, such as a local area network (LAN). The plurality of transmitters 10 generate frequency-division multiplexed optical signals (hereinafter, referred to as "multiplexed optical signals") S1 to S4 where a plurality of subcarrier signals are frequency-division multiplexed from the data signals D1 to D4, and output the signals to the multiplexer 11. The data signals D1 to D4 may be, but are not limited to, Ethernet® frames.

In more detail, the transmitters 10 generate frequency-division multiplexed signals by superimposing and multiplexing the data signals D1 to D4 on the plurality of subcarrier signals, and generate multiplexed optical signals S1 to S4 by optically modulating light, which is transmitted from an optical source, with the frequency-division multiplexed signals. The center frequencies (hereinafter, referred to as "frequencies") f1 to f4 of the multiplexed optical signals S1 to S4 are determined based on the frequency of the light transmitted from the optical source of each transmitter 10.

The multiplexer 11 is, for example, an optical coupler and wavelength-multiplexes the plurality of multiplexed optical signals S1 to S4 to generate the WDM signal Sm which is then output to the optical fiber 90. The WDM signal Sm is transmitted to the transmission apparatus 2 via the OADM 3.

The OADM 3 includes a wavelength selective switch (WSS) 30 and adds a new optical signal Sa to the WDM signal Sm by means of the wavelength selective switch 30. In addition, the OADM 3 drops an optical signal from the WDM signal Sm by means of an optical splitter or filter (not illustrated).

The wavelength selective switch 30 is a device which passes light having a selected wavelength, and includes an optical filter therein. Therefore, the frequencies f1 to f4 of the multiplexed optical signals S1 to S4 multiplexed on the WDM signal Sm are adjusted such that each band falls within a transmission band BW of the optical filter. The WDM signal Sm which passed through the OADM 3 is input to the transmission apparatus 2.

The transmission apparatus 2 is an example of a second transmission apparatus and includes a plurality of receivers 20 and a de-multiplexer 22. The de-multiplexer 22 de-multiplexes the WDM signal Sm so as to be induced to the plurality of receivers 20, respectively. The de-multiplexer 22 outputs the multiplexed optical signals S1 to S4 of the frequencies f1 to f4 to the plurality of receivers 20, respectively.

The receivers 20 receive the multiplexed optical signals S1 to S4, reproduce the data signals D1 to D4 from the multiplexed optical signals S1 to S4, and output the reproduced data signals D1 to D4 to a user network.

In this manner, the transmission apparatus 1 transmits the multiplexed optical signals S1 to S4 where the plurality of subcarrier signals are frequency-division multiplexed, and the transmission apparatus 2 receives the multiplexed optical signals S1 to S4.

A proper control is required for the frequency of transmission light since the frequency varies within a range of several GHz due to a deterioration of a transmitter by aging or the wavelength dependency of a transmitter. In the transmitter 10, the control of the frequencies f1 to f4 is performed to optimize the spacing M between adjacent multiplexed optical signals S1 to S4, as represented in the spectral waveforms denoted by the symbol G.

The spacing M between the optimal frequencies f1 to f4 depends on, for example, narrowing of a band by an optical filter of the wavelength selective switch 30 of the OADM 3, a linear crosstalk between the multiplexed optical signals S1 to S4, and a nonlinear crosstalk between the multiplexed optical signals S1 to S4 due to a Kerr effect which occurs in the optical fiber 90. However, since these factors vary depending on the traffics on the transmission line and operational conditions of a network, the frequency control for the optimization of the spacing M is required to be performed in accordance with the conditions of the transmission line.

Therefore, the transmission apparatus 2 improves the transmission characteristics by calculating a signal quality for each of the subcarrier signals that has been frequency-multiplexed on the multiplexed optical signals S1 to S4 and controlling the frequencies f1 to f4 of the local oscillation light of an optical source of the transmitter 10 based on a deviation in the signal quality between the subcarrier signals.

Figure 2:
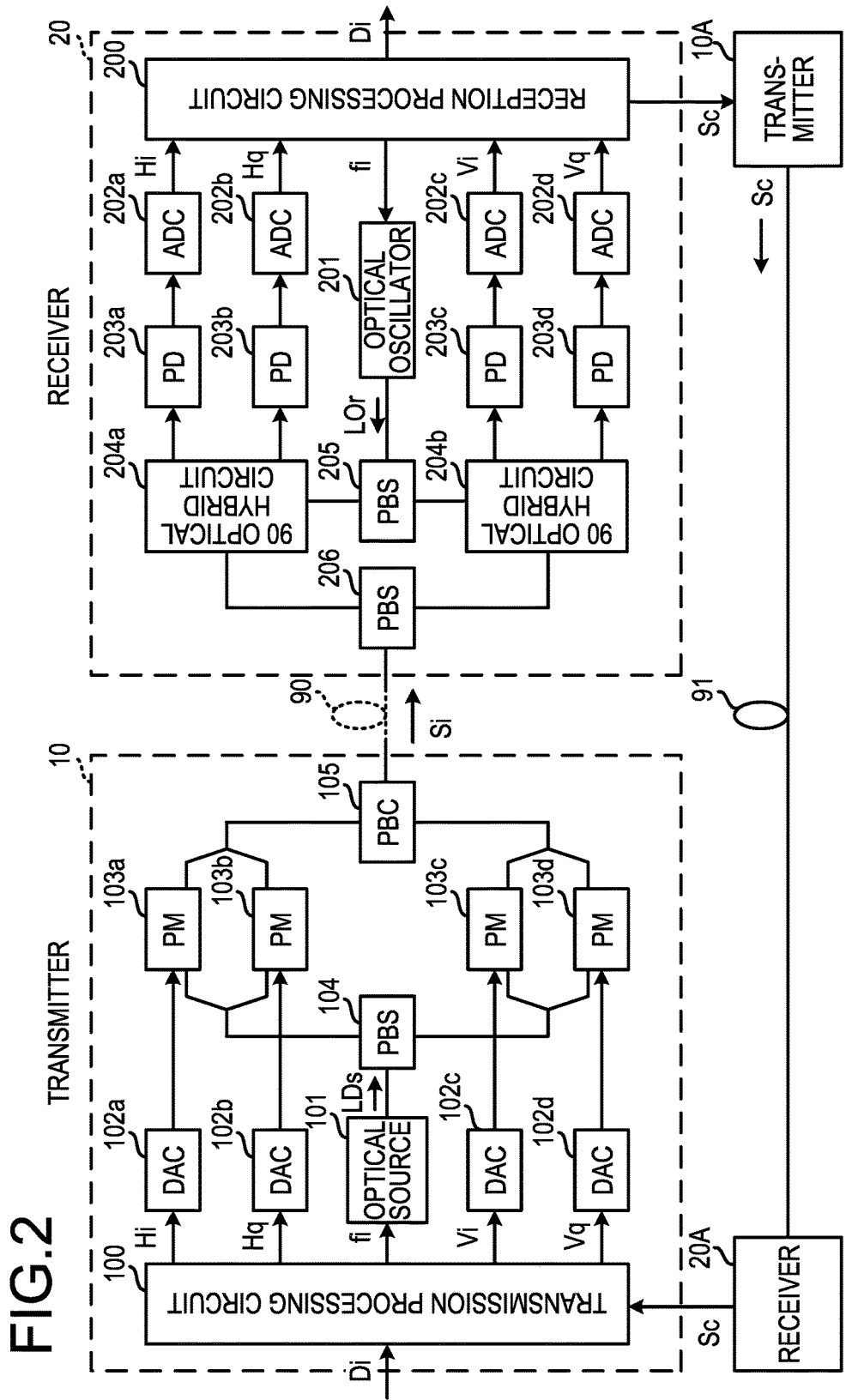
FIG. 2 is a view illustrating an exemplary configuration of a transmitter and a receiver.

FIG. 2 is a view illustrating an exemplary configuration of a transmitter 10 and a receiver 20. FIG. 2 illustrates a set of transmitter 10 and receiver 20 which transmits and receives the common multiplexed optical signals S1 to S4, respectively, among the plurality of transmitters 10 and receivers 20 illustrated in FIG. 1. The transmitter 10 and the receiver 20 perform a transmission process based on, for example, a digital coherent optical transmission system, without being limited thereto.

The transmitter 10 includes a transmission processing circuit 100, an optical source 101, and digital-to-analog converters 102a to 102d. In addition, the transmitter 10 further includes phase modulators (PMs) 103a to 103d, a polarization beam splitter (PBS) 104, and a polarization beam combiner (PBC) 105.

The transmission processing circuit 100 superimposes a data signal Di on a plurality of subcarrier signals having different center frequencies and multiplexes the plurality of subcarrier signals to generate a frequency-division multiplexed signal. The transmission processing circuit 100 generates four digital signals Hi, Hq, Vi, and Vq indicating electric field information of the generated frequency-division multiplexed signal and outputs the four digital signals to the DACs 102a to 102d, respectively. The transmission processing circuit 100 may be, for example, a digital signal processor (DSP), but without being limited thereto, the transmission processing circuit 100 may be, for example, a field programmable gate array (FPGA). The configuration of the transmission processing circuit 100 will be described later.

The DACs 102a to 102d convert the digital signals Hi, Hq, Vi, and Vq into analog signals, respectively. The analog signals are input to the PMs 103a to 103d. The DACs 102a to 102d may be provided within the transmission processing circuit 100.

The optical source 101 is, for example, a laser diode (LD) and outputs transmission light LDs of a frequency fi (i=1, 2, 3, 4), which is set from the transmission processing circuit 100, to the PBS 104. The PBS 104 separates the transmission light LDs into components of each of an H axis and a V axis, which are polarization axes. The H axis components of the transmission light LDs are input to the PMs 103a and 103b, respectively, and the V axis components of the transmission light LDs are input to the PMs 103c and 103d, respectively. The transmission light LDs is an example of carrier light.

The PMs 103a to 103d optically modulate the transmission light LDs based on the analog signals from the DACs 102a to 102d, respectively. More specifically, the PMs 103a and 103b intensity/phase-modulate the H axis components of the transmission light LDs based on the analog signals from the DACs 102a and 102b, and the PMs 103c and 103d intensity/phase-modulate the V axis components of the transmission light LDs based on the analog signals from the DACs 102c and 102d.

The intensity/phase-modulated H axis components and V axis components of the transmission light LDs are input to the PBC 105. The PBC 105 polarizes and combines the H axis components and V axis components of the transmission light LDs which are then output, as a multiplexed optical signal Si (i=1 to 4), to the optical fiber 90. In this manner, the PMs 103a to 103d, which are an example of a generator, generate the multiplexed optical signal Si by optically modulating the transmission light LDs of the optical source 101 based on the plurality of frequency-division multiplexed subcarrier signals, that is, the frequency-division multiplexed signals.

The receiver 20 includes a reception processing circuit 200, an optical source 201, analog-to-digital converters (ADC) 202a to 202d, photo diodes (PDs) 203a to 203d, 90° optical hybrid circuits 204a and 204b, and PBSs 205 and 206. The PBS 206 separates the multiplexed optical signal Si, which is input from the transmitter 10 via the optical fiber 90, into the H axis components and the V axis components which are then output to the 90° optical hybrid circuits 204a and 204b respectively.

The optical source 201 inputs local oscillation light LOr having the same frequency as that of the transmission light LDs of the transmitter 10 to the PBS 205. The PBS 205 separates the local oscillation light LOr into H axis components and V axis components which are then output to the 90° optical hybrid circuits 204a and 204b, respectively.

The 90° optical hybrid circuit 204a includes a waveguide for causing the H axis components of the multiplexed optical signal Si and the H axis components of the local oscillation light LOr to interfere with each other and detects the H axis components of the multiplexed optical signal Si. As a result of the detection, the 90° optical hybrid circuit 204a outputs optical components of an in-phase (I channel) and a quadrature (Q channel), which derive the amplitude and phase information, to the PDs 203a and 203b, respectively.

The 90° optical hybrid circuit 204b includes a waveguide for causing the V axis components of the multiplexed optical signal Si and the V axis components of the local oscillation light LOr to interfere with each other and detects the V axis components of the multiplexed optical signal Si. As a result of the detection, the 90° optical hybrid circuit 204b outputs optical components of an in-phase (I channel) and a quadrature (Q channel), which derive the amplitude and phase information, to the PDs 203c and 203d, respectively.

The PDs 203a to 203d convert the input optical components into electrical signals which are then output to the ADCs 202a to 202d, respectively. The ADCs 202a to 202d convert the electrical signals input from the PDs 203a to 203d into digital signals Hi, Hq, Vi, and Vq, respectively, which are then input to the reception processing circuit 200.

The reception processing circuit 200 combines the digital signals Hi, Hq, Vi, and Vq to generate a frequency-division signal and extracts subcarrier signals multiplexed on the frequency-division multiplexed signal. The reception processing circuit 200 generates a data signal Di from each subcarrier signal.

In addition, the reception processing circuit 200 calculates a signal quality of each subcarrier signal and controls the frequency fi of the transmission light LDs of the optical source 101, based on a deviation in signal quality between the subcarrier signals. The reception processing circuit 200 generates a control signal Sc including control information of the frequency fi and outputs the signal to a transmitter 10A.

The transmitter 10A transmits the control signal Sc to a receiver 20A via an optical fiber 91. Upon receiving the control signal Sc, the receiver 20A outputs the control signal Sc to the transmission processing circuit 100. The transmitter 10A and the receiver 20A are installed in, for example, the transmission apparatuses 2 and 1, respectively, and transmit the WDM signal Sm in the direction reverse to the transmission direction of the transmitter 10 and the receiver 20.

In this case, the transmitter 10A transmits the control signal Sc via a control channel of a predetermined wavelength multiplexed on the WDM signal Sm. The control signal Sc is superimposed on a carrier of the control channel after being subjected to, for example, low-speed frequency modulation or intensity modulation. However, the transmitter 10A and the receiver 20A may be a transmission system separated from the transmission system illustrated in FIG. 1.

In this manner, the receiver 20 feedback-controls the frequency fi of the transmission light LDs of the transmitter 10, based on a deviation in signal quality between subcarrier signals.

Figure 3:
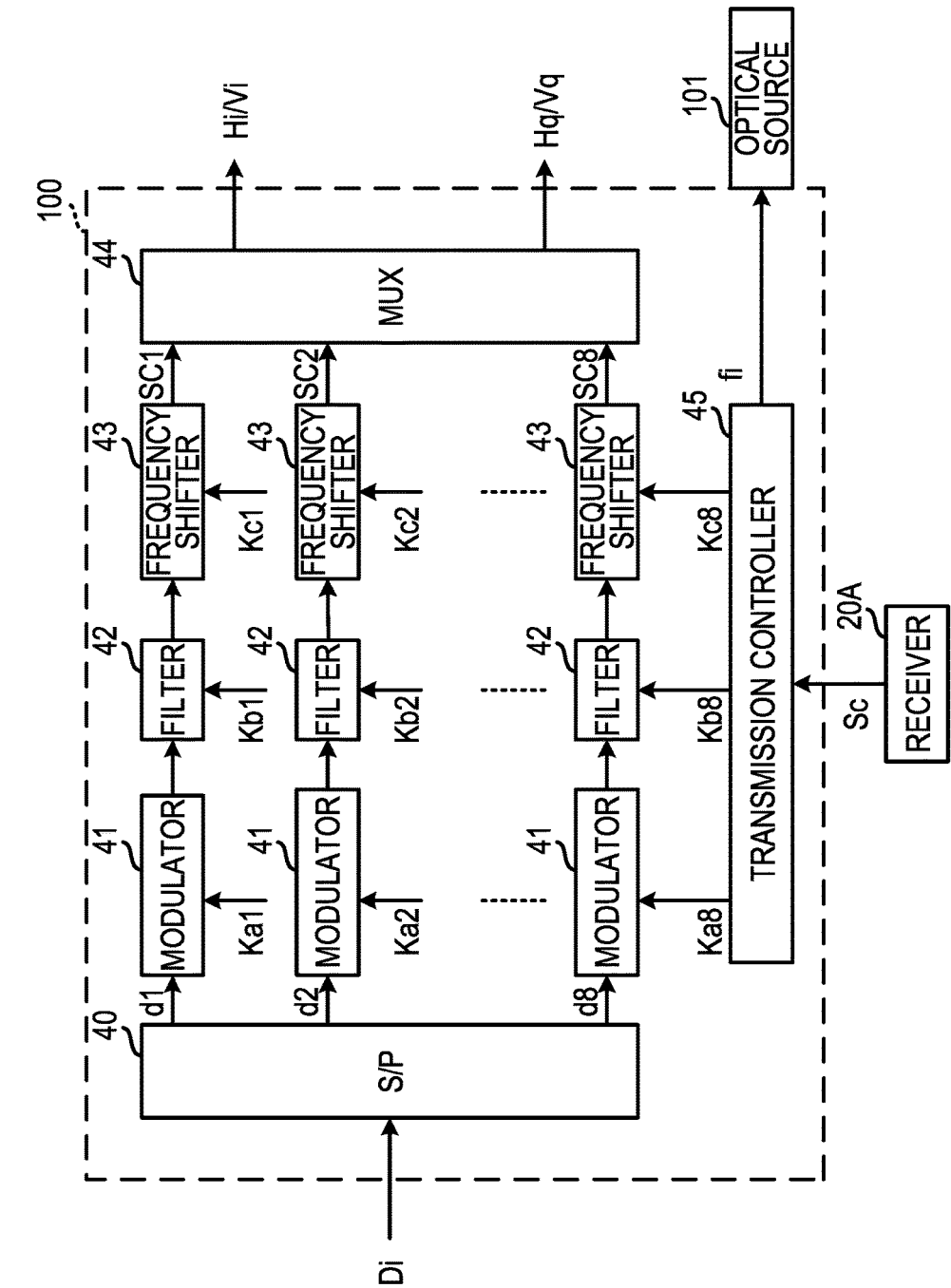
FIG. 3 is a view illustrating an exemplary configuration of a transmission processing circuit.

FIG. 3 is a view illustrating an exemplary configuration of the transmission processing circuit 100. The transmission processing circuit 100 includes a transmission controller 45, a serial-parallel conversion circuit (S/P) 40, a plurality of modulators 41, a plurality of filters 42, a plurality of frequency shifters 43, and a multiplexer (MUX) 44. The modulators 41, the filters 42, and the frequency shifters 43 are provided as many as subcarrier signals SC1 to SC8. Although the transmission processing circuit 100 of this example modulates the data signal Di with 8 subcarrier signals SC1 to SC8, the number of subcarrier signals is not limited.

The transmission processing circuit 100 superimposes the data signal Di on the plurality of subcarrier signals SC1 to SC8 having different center frequencies and multiplexes the plurality of subcarrier signals SC1 to SC8 to generate a frequency-division multiplexed signal. The frequency-division multiplexed signal is transmitted as the multiplexed optical signal Si by optically modulating the transmission light LDs of the optical source 101, as described above with reference to FIG. 2.

The serial-parallel conversion circuit 40 converts the data signal Di from a serial signal into 8 parallel signal dl to d8 through serial-parallel conversion. The parallel signals dl to d8 are output to the plurality of modulators 41, respectively.

The modulators 41 modulate the parallel signals dl to d8. The modulators 41 receive setting signals Ka1 to Ka8 from the transmission controller 45 and perform a modulation process by a modulation system, based on the setting signals Ka1 to Ka8. The modulation system may be, but is not limited to, quaternary phase shift keying (QPSK) or 16 quadrature amplitude modulation (16QAM).

The filters 42 filter the parallel signals dl to d8 output from the modulators 41. The filters 42 are, for example, Nyquist filters which Nyquist-shape the parallel signals dl to d8. Accordingly, since the spectral waveforms of the parallel signals dl to d8 are shaped in rectangle, the width of the frequency band of the multiplexed optical signal Si is reduced.

The filters 42 receive the setting signals Kb1 to Kb8 from the transmission controller 45, and filter the parallel signals dl to d8 by bands based on the setting signals Kb1 to Kb8. The parallel signals dl to d8 which passed through the filters 42 are input to the frequency shifters 43.

The frequency shifters 43 shift the spectral center frequencies of the parallel signals dl to d8 to different frequencies. The frequency shifters 43 receive the setting signals Kc1 to Kc8 from the transmission controller 45, and shift the spectral center frequencies by shift amounts based on the setting signals Kc1 to Kc8. Accordingly, the subcarrier signals SC1 to SC8 having different frequencies are generated. The subcarrier signals SC1 to SC8 are input to the multiplexer 44.

The multiplexer 44 is an example of a multiplexer and multiplexes the subcarrier signals SC1 to SC8 to generate a frequency-division multiplexed signal. The multiplexer 44 separates the frequency-division multiplexed signal into digital signals Hi, Hq, Vi, and Vq for each polarization component.

The transmission controller 45 controls a transmission process of the transmission processing circuit 100. The transmission controller 45 controls the frequency fi of the transmission light LDs for the optical source 101 based on the control information of the control signal Sc input from the receiver 20A.

In addition, based on a predetermined setting, the transmission controller 45 outputs the setting signals Ka1 to Ka8, Kb1 to Kb8, and Kc1 to Kc8 to the plurality of modulators 41, the plurality of filters 42, and the plurality of frequency shifters 43. In addition, the transmission controller 45 may control a multi-value level of modulation of the modulators 41 by outputting the setting signals Ka1 to Ka8, Kb1 to Kb8, and Kc1 to Kc8 according to the control information of the control signal Sc, as described later.

Figure 4:
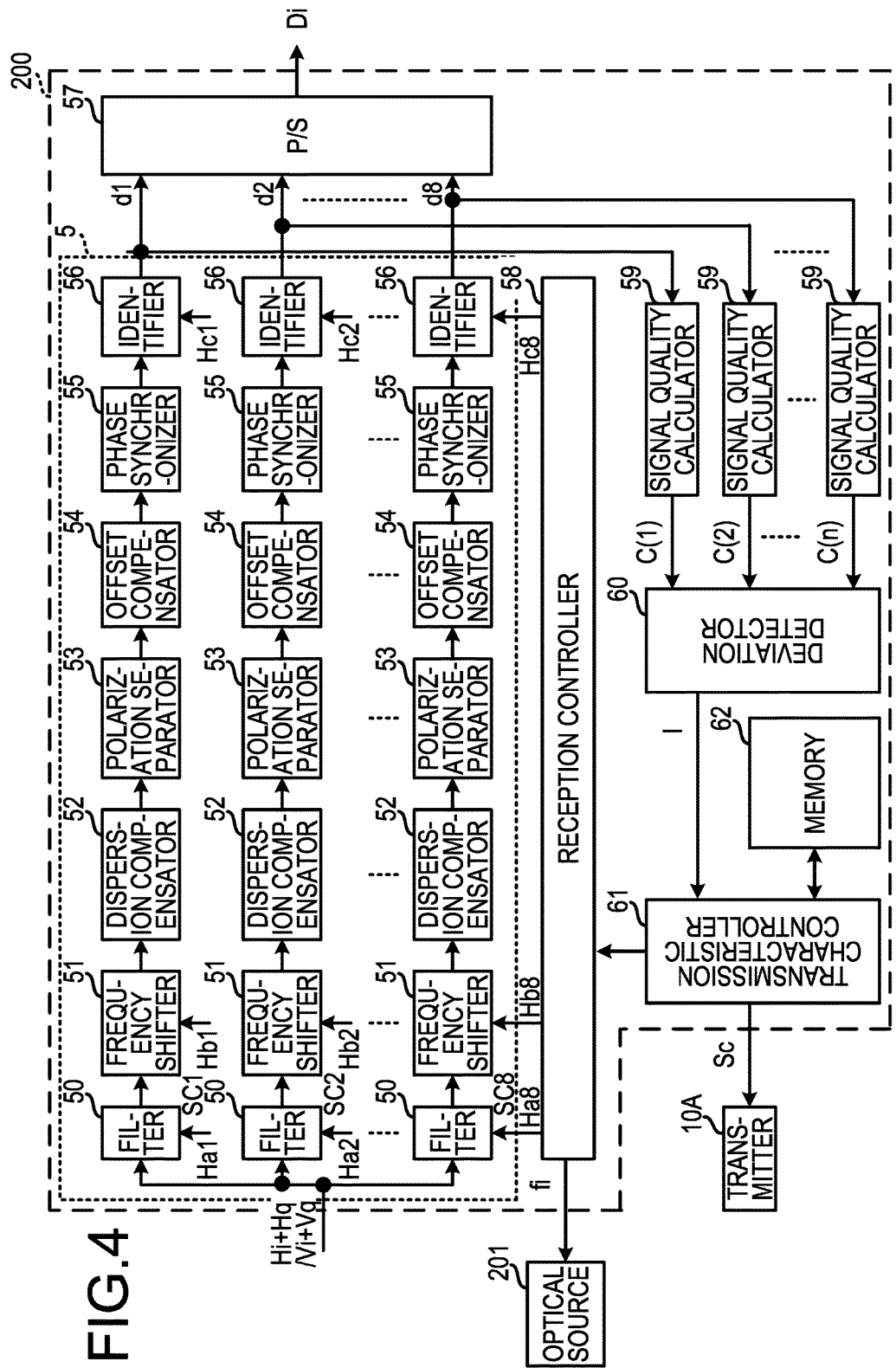
FIG. 4 is a view illustrating an exemplary configuration of a reception processing circuit.

FIG. 4 is a view illustrating an exemplary configuration of the reception processing circuit 200. The reception processing circuit 200 includes a signal restoration part 5, a parallel-serial conversion circuit (P/S) 57, a plurality of signal quality calculator 59, a deviation detector 60, a transmission characteristic controller 61, and a memory 62. The reception processing circuit 200 may be, for example, a digital signal processor (DSP), but without being limited thereto, the reception processing circuit 200 may be, for example, a field programmable gate array (FPGA).

The signal restoration part 5 restores the plurality of parallel signals dl to d8 from the multiplexed optical signal Si. The signal restoration part 5 includes a plurality of filters 50, a plurality of frequency shifters 51, a plurality of dispersion compensators 52, a plurality of polarization separators 53, a plurality of offset compensators 54, a plurality of phase synchronizers 55, and a plurality of identifiers 56. The filters 50, the frequency shifters 51, the dispersion compensators 52, the polarization separators 53, the offset compensators 54, the phase synchronizers 55, the identifiers 56, and the signal quality calculator 59 are provided as many as the subcarrier signals SC1 to SC8.

The digital signals Hi, Qi, Vi, and Vq input from the ADCs 202a to 202d are synthesized to a frequency-division multiplexed signal within the reception processing circuit 200. The frequency-division multiplexed signal is branched and input to each filter 50. The filters 50 receive setting signals Ha1 to Ha8 from a reception controller 58, and filter the frequency-division multiplexed signal in a frequency band based on the setting signals Ha1 to Ha8 so as to acquire the subcarrier signals SC1 to SC8. The subcarrier signals SC1 to SC8 are output to the frequency shifters 51. The plurality of filters 50 is an example of an acquisition part.

The frequency shifters 51 shift the frequencies of the subcarrier signals SC1 to SC8. The frequency shifters 51 receive setting signals Hb1 to Hb8 from the reception controller 58, and shift the frequencies of the subcarrier signals SC1 to SC8 by amounts based on the setting signals Hb1 to Hb8.

The dispersion compensators 52 compensate waveform distortion due to chromatic dispersion which occurs in the optical fiber 90, for the subcarrier signals SC1 to SC8 output from the frequency shifters 51. For example, the dispersion compensators 52 compensate waveform distortion caused by chromatic dispersion by applying a characteristic reverse to the chromatic dispersion within the optical fiber 90.

The polarization separators 53 demultiplex a polarization multiplexing signal of the subcarrier signals SC1 to SC8 output from the dispersion compensators 52. The offset compensators 54 compensate a frequency offset due to a frequency error between the optical source 101 of the transmitter 10 and the optical source 201 of the receiver 20 for the subcarrier signals SC1 to SC8 output from the polarization separators 53.

The phase synchronizers 55 correct a difference in the phase between the optical source 101 of the transmitter 10 and the optical source 201 of the receiver 20 such that the subcarrier signals SC1 to SC8 output from the offset compensators 54 are normally demodulated by a signal constellation (signal space diagram) depending on a modulation system. The signal constellation represents signal points based on signal amplitude and phase on a complex plane. The phase synchronizers 55 output the corrected subcarrier signals SC1 to SC8 to the identifiers 56.

The identifiers 56 demodulate the subcarrier signals SC1 to SC8 by identifying the signal points based on the signal constellation depending on a modulation system. The identifiers 56 receive setting signals Hc1 to Hc8 from the reception controller 58, and perform a demodulation process according to a demodulation system based on the setting signals Hc1 to Hc8. Accordingly, the parallel signals d1 to d8 are restored. The parallel signals d1 to d8 are input to each of the parallel-serial conversion circuit 57 and the plurality of signal quality calculators 59.

The parallel-serial conversion circuit 57 serially converts the parallel signals d1 to d8 to restore the original data signal Di which is then output to the circuit of a subsequent stage.

The plurality of signal quality calculators 59 are an example of calculators, and calculate signal qualities C(1) to C(8) of the plurality of subcarrier signals SC1 to SC8, respectively. A method of calculating the signal qualities C(1) to C(8) is not particularly limited, but, for example, the following method may be adopted.

$$C(i)=20\times\log\{\sqrt{2}\text{erf}^{-1}(2\times\text{BER}(i))\} \quad (1)$$

The signal quality calculators 59 calculate the signal quality (Ci) (i=1, 2, . . . , 8) according to, for example, the above equation (1). In the equation (1), err' is the inverse of an error function, and BER(i) is a bit error rate of the subcarrier signals SC1 to SC8.

$$C(i)=20\times\log\{\sqrt{2}\text{erf}^{-1}(2\times\text{BERs}(i))\} \quad (2)$$

Further, the subcarrier signals SC1 to SC8 may be taken as pilot signals having a known pattern, and then, a hard decision may be used for a decision of the bit error rate. In this case, the signal quality calculators 59 calculate the signal quality (Ci) according to, for example, the above equation (2). In the equation (2), BERs(i) is a bit error rate of the hard decision of the subcarrier signals SC1 to SC8.

$$C(i)=-\log(m(i)/B(i)) \quad (3)$$

In addition, the signal quality calculators 59 may calculate the signal quality C(i) by calculating the mutual information amount m(i) from the information of the pilot signals and the demodulated constellation (intensity and phases of the signals) according to, for example, the above equation (3). In the equation (3), B(i) is a bit number transmitted in one symbol and is determined depending on a multi-value level of modulation of the modulators 41.

$$m(i)=H(Y)(i)-H(Y|X))(i) \quad (4)$$

The mutual information amount m(i) is calculated by, for example, the equation (4) above. Here, H(Y)(i) is calculated from a probability distribution of signal points of the subcarrier signals SC1 to SC8 on the constellation, and H(Y|X)) (i) is calculated from a conditional probability distribution using a pilot signal.

Figure 5:
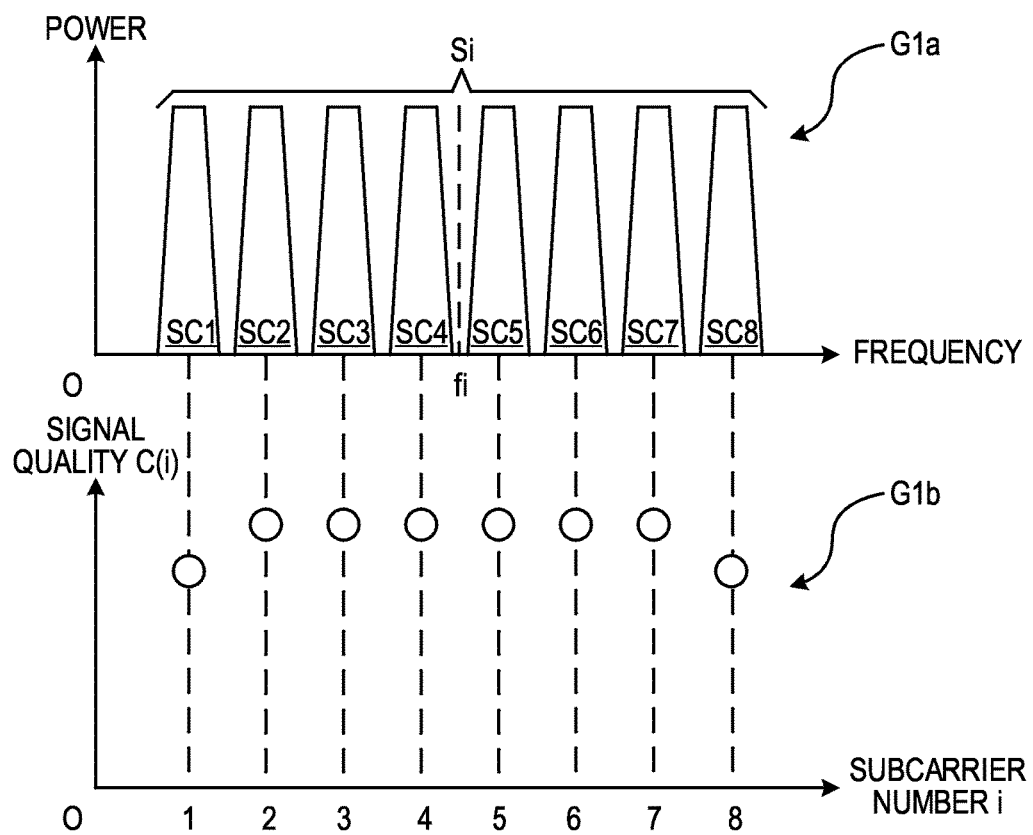
FIG. 5 is a view illustrating an example of spectral waveforms and signal qualities of subcarrier signals.

FIG. 5 is a view illustrating an example of spectral waveforms and signal qualities C(1) to C(8) of the subcarrier signals SC1 to SC8. The symbol G1a denotes spectral waveforms of the subcarrier signals SC1 to SC8, and the symbol G1b denotes signal qualities C(1) to C(8) for the respective subcarrier numbers i.

The spectral waveforms of the subcarrier signals SC1 to SC8 are substantially rectangular and are distributed within a frequency band of the multiplexed optical signal Si around the frequency fi. Among the subcarrier signals SC1 to SC8, the spectral waveform of the subcarrier signal SC1 is located at a low frequency side, and the spectral waveform of the subcarrier signal SC8 is located at a high frequency side.

The signal qualities C(1) to C(8) are calculated by the signal quality calculators 59 as described above. As indicated by the symbol G1B, the deviation detector 60 detects a deviation of the signal qualities C(1) to C(8) in a state where the signal qualities C(1) to C(8) are arranged in an order of the subcarrier numbers i. This example is an example of a state where no deviation is present in the signal qualities C(1) to C(8). The signal quality calculators 59 output the signal qualities C(1) to C(8) of the subcarrier signals SC1 to SC8 to the deviation detector 60.

Referring back to FIG. 4, the deviation detector 60 is an example of a detector and detects a deviation of the signal qualities C(1) to C(8) between the plurality of subcarrier signals SC1 to SC8. In more detail, the deviation detector 60 calculates a deviation determination value I from the signal qualities C(1) to C(8).

$$I = \frac{\sum_{i=1}^{n} C(i)\times i}{\sum_{i=1}^{n} C(i)} - \frac{\sum_{i=1}^{n} i}{n} \quad (5)$$

The deviation detector 60 calculates the deviation determination value I according to, for example, the above equation (5). In the equation (5), a variable n is the number of the subcarrier signals SC1 to SC8. In this example, n=8. The deviation detector 60 outputs the calculated deviation determination value I, as a numerical value indicating the status of the deviation of the signal qualities C(1) to C(8), to the transmission characteristic controller 61.

In more detail, when the deviation determination value I=0, it is determined that no deviation is present in the signal qualities C(1) to C(8). When I>0, it is determined that the signal qualities C(1) to C(8) of the subcarrier signals SC1 to SC8 at the low frequency side are lowered. When I<0, it is determined that the signal qualities C(1) to C(8) of the subcarrier signals SC1 to SC8 at the high frequency side are lowered.

The transmission characteristic controller 61 is an example of a controller and controls the frequency fi of the transmission light LDs for the optical source 101 of the transmitter 10 in response to the deviation of the signal qualities C(1) to C(8) which is detected by the deviation detector 60. In more detail, the transmission characteristic controller 61 controls the frequency fi to be positively or negatively shifted depending on the deviation determination value I. When the deviation determination value I=0, the transmission characteristic controller 61 does not perform the shift control of the frequency fi.

Figure 6:
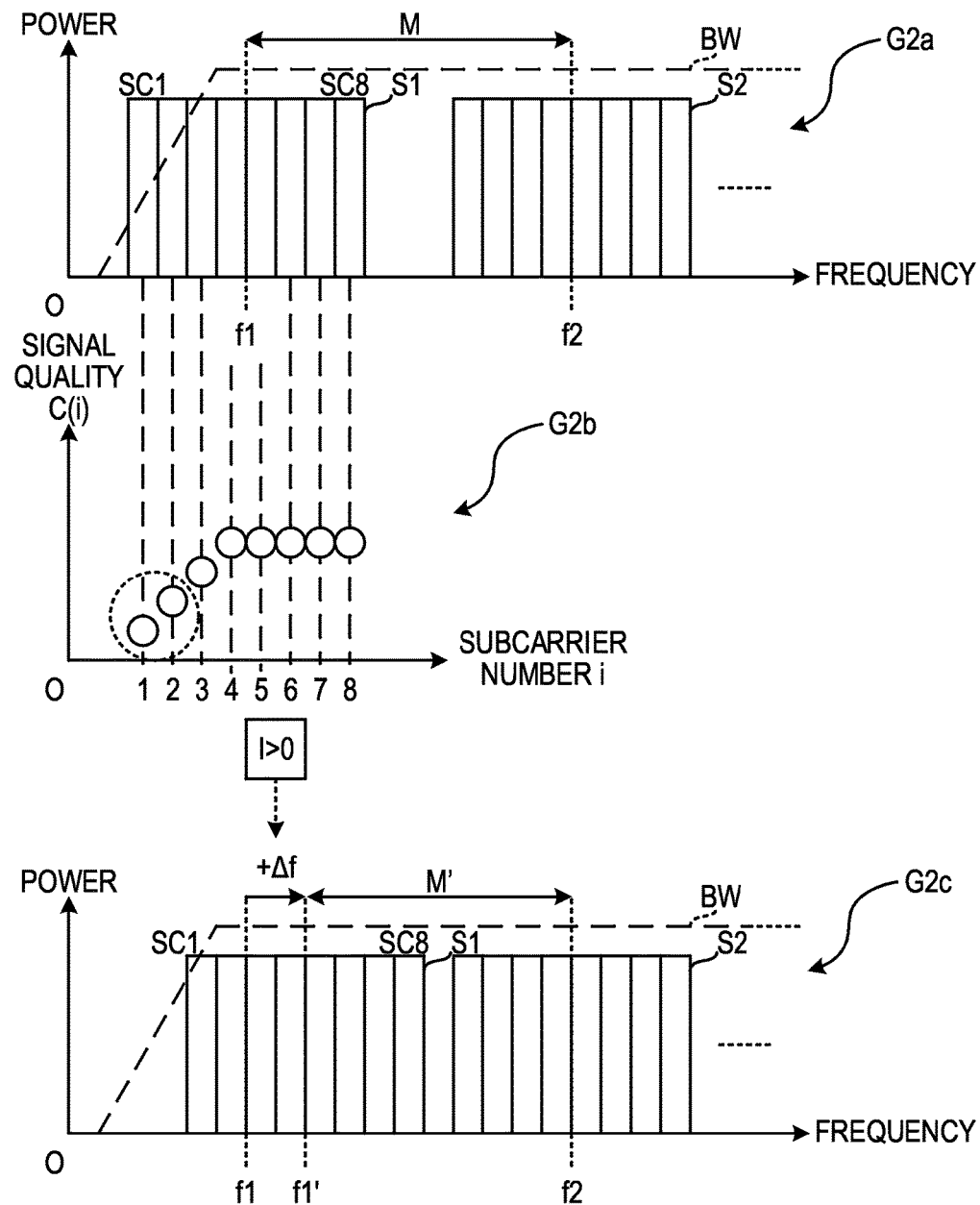
FIG. 6 is a view illustrating an exemplary operation in a case where a frequency of an optical source is controlled to be positively shifted.

FIG. 6 illustrates an exemplary operation in a case where the frequency f1 of the optical source 101 is controlled to be positively shifted. In the example described hereinafter, an operation of shift control of the frequency f1 of the multiplexed optical signal S1 at the lowest frequency side, among the multiplexed optical signals S1 to S4 multiplexed on the WDM signal Sm, will be described. However, it should be noted that the same shift control is performed for frequencies f2 to f4 of other multiplexed optical signals S2 to S4.

The symbol G1a denotes spectral waveforms of the multiplexed optical signals S1 and S2 before the shift control, and the symbol G2b denotes the signal qualities C(1) to C(8) of the multiplexed optical signal S1 before the shift control. In the example described hereinafter, it is assumed that only the frequency f1 of the multiplexed optical signal S1 is controlled to be shifted, and the frequency f2 of the multiplexed optical signal S2 is not controlled to be shifted.

Among the subcarrier signals SC1 to SC8, the spectral waveforms of the subcarrier signals SC1 and SC2 at the low frequency side are reduced by the optical filter, which has been described with reference to FIG. 1, since the spectral waveforms overlap with the edge portion of the transmission band BW of the optical filter. Therefore, the signal qualities C(1) and C(2) of the subcarrier signals SC1 and SC2 are lower than those of other subcarrier signals SC3 to SC8 (see the dotted circle) and the deviation determination value I is larger than 0.

The symbol G1c denotes the spectral waveforms of the multiplexed optical signals S1 and S2 after the shift control. When the deviation determination value I>0, the transmission characteristic controller 61 controls the frequency f1 to be positively shifted. In more detail, the transmission characteristic controller 61 increases the frequency f1 by pitch width+Δf (Δf>0).

This control information is transmitted from the transmitter 10A to the receiver 20A, as described above, and the transmission controller 45 of the transmitter 10 controls the frequency fi of the optical source 101 based on the control information acquired from the receiver 20A.

In addition, the transmission characteristic controller 61 outputs the control information to the reception controller 58. The reception controller 58 controls the frequency f1 of the optical source 201 of the receiver 20 base on the control information in the same way as that for the optical source 101 of the transmitter 10.

Thus, the frequency f1 of the multiplexed optical signal S1 is increased to fi', and spacing M between the frequencies f1 and f2 of the multiplexed optical signals S1 and S2 is decreased to M'. Therefore, the spectral waveforms of the subcarrier signals SC1 and SC2 at the low frequency side are positively shifted, and the overlapping with the edge portion of the transmission band BW of the optical filter is avoided.

Accordingly, the signal qualities C(1) and C(2) of the subcarrier signals SC1 and SC2 become higher, and the signal qualities C(1) to C(8) of the subcarrier signals SC1 to SC8 are brought into the state where no deviation is present as indicated by the symbol G1b in FIG. 5. Therefore, the transmission characteristics are improved.

Figure 7:
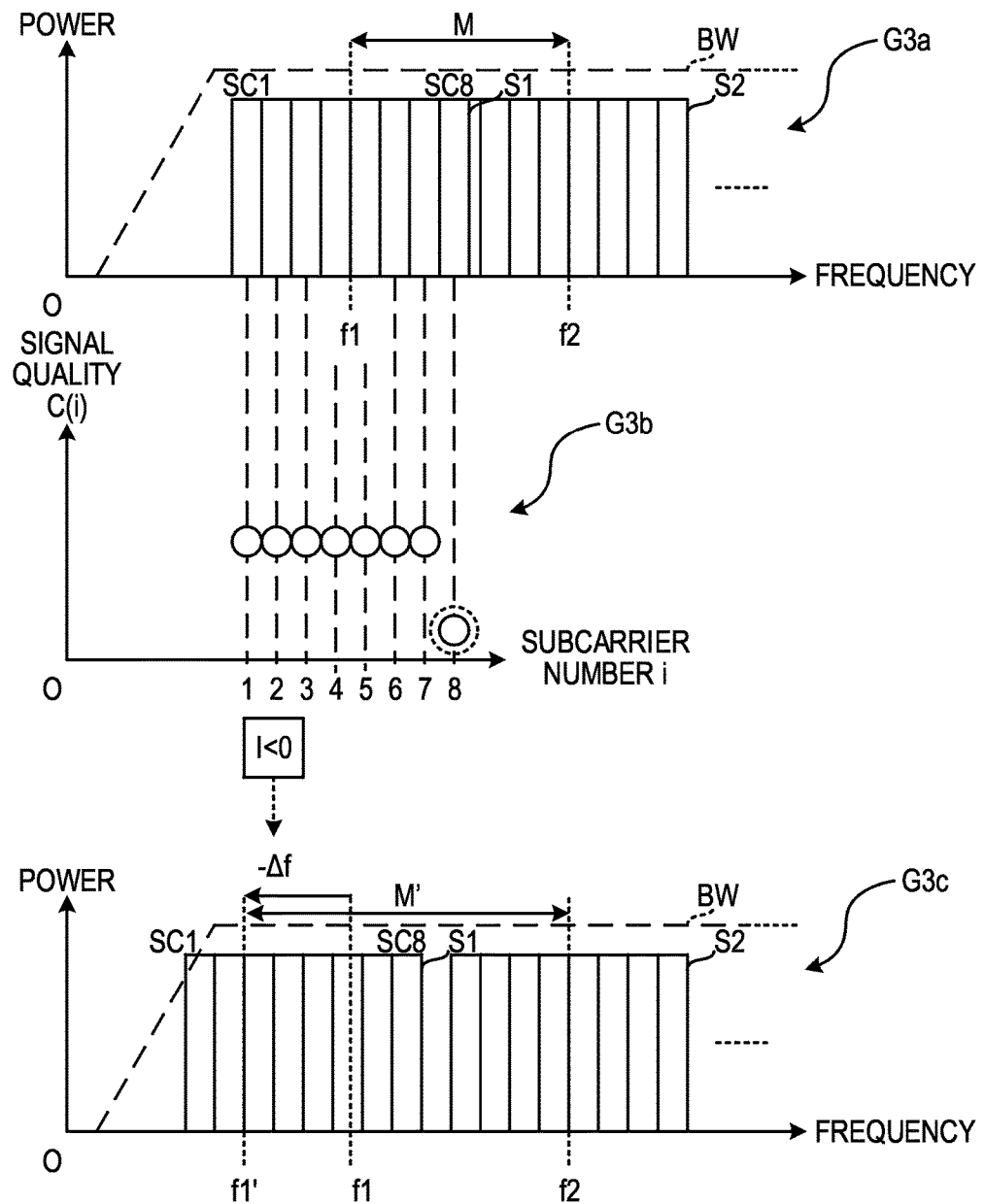
FIG. 7 is a view illustrating an exemplary operation in a case where the frequency of the optical source is controlled to be negatively shifted.

Meanwhile, FIG. 7 illustrates an exemplary operation in a case where the frequency f1 of the optical source 101 is controlled to be negatively shifted. The symbol G3a denotes spectral waveforms of the multiplexed optical signals S1 and S2 before the shift control, and the symbol G3b denotes the signal qualities C(1) to C(8) of the multiplexed optical signal S1 before the shift control.

Among the subcarrier signals SC1 to SC8, the spectral waveform of the subcarrier signal SC8 at the high frequency side is affected by a crosstalk with the adjacent multiplexed optical signal S2 since the spectral waveform overlaps with the spectral waveform of the adjacent multiplexed optical signal S2. Therefore, the signal quality C(8) of the subcarrier signal SC8 is lower than those of the other subcarrier signals SC1 to SC7 (see the dotted circle), and the deviation determination value I is smaller than 0.

The symbol G3c denotes the spectral waveforms of the multiplexed optical signals S1 and S2 after the shift control. When the deviation determination value I<0, the transmission characteristic controller 61 controls the frequency f1 to be negatively shifted. In more detail, the transmission characteristic controller 61 decreases the frequency f1 by pitch width Δf (Δf>0). Like the case where the deviation determination value I>0, this control information is output to the transmission controller 45 and the reception controller 50, and the frequency f1 of the optical source 201 of the receiver 20 is also controlled in the same way.

Thus, the frequency f1 of the multiplexed optical signal S1 is decreased to ft, and spacing M between the frequencies f1 and f2 of the multiplexed optical signals S1 and S2 is increased to M'. Therefore, the spectral waveform of the subcarrier signal SC8 at the high frequency side is negatively shifted, and the overlapping with the spectral waveform of the adjacent multiplexed optical signal S2 is avoided.

Accordingly, the signal quality C(8) of the subcarrier signal SC8 becomes higher, and the signal qualities C(1) to C(8) of the subcarrier signals SC1 to SC8 are brought into the state where no deviation is present as indicated by the symbol G1b in FIG. 5. Therefore, the transmission characteristics are improved.

Figure 8:
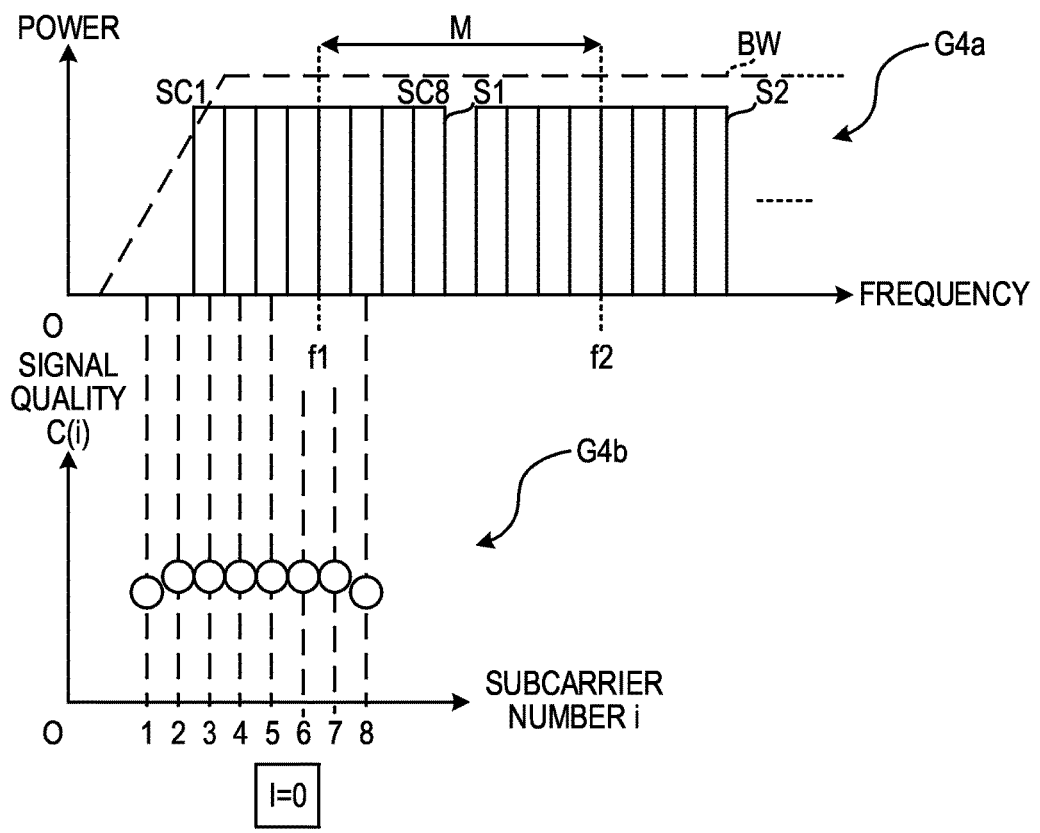
FIG. 8 is a view illustrating an exemplary operation in a case where the frequency of the optical source is not controlled to be shifted.

FIG. 8 illustrates an exemplary operation in a case where the frequency f1 of the optical source 101 is not controlled to be shifted. The symbol G4a denotes spectral waveforms of the multiplexed optical signals S1 and S2, and the symbol G4b denotes the signal qualities C(1) to C(8) of the multiplexed optical signal S1 before the shift control.

As indicated by the symbol G4b, since the signal qualities C(1) to C(8) of the subcarrier signals SC1 to SC8 are in the state where no deviation is present, the shift control of the frequency f1 is not performed. Therefore, the frequency f1 of the optical source 101 and the spacing M between the frequency fl and the frequency f2 is maintained. In addition, even when the shift control is not performed, the transmission characteristic controller 61 may output the control information with pitch width Δf=0 to the transmission controller 45 and the reception controller 58.

Referring back to FIG. 4, the memory 62 is an example of a holder and holds a variety of information used for the control by the transmission characteristic controller 61. The transmission characteristic controller 61 performs the control by referring to the information held in the memory 61, as illustrated in an example to be described later.

The reception controller 58 outputs the setting signals Ha1 to Ha8, the setting signals Hb1 to Hb8, and the setting signals Hc1 to Hc8 to the plurality of filters 50, the plurality of frequency shifters 51, and the plurality of identifiers 56. In addition, as described later, when the multi-value level of modulation of the modulators 41 is controlled, the reception controller 58 outputs the setting signals Ha1 to Ha8, Hb1 to Hb8, and Hc1 to Hc8 according to the control information.

Figure 9:
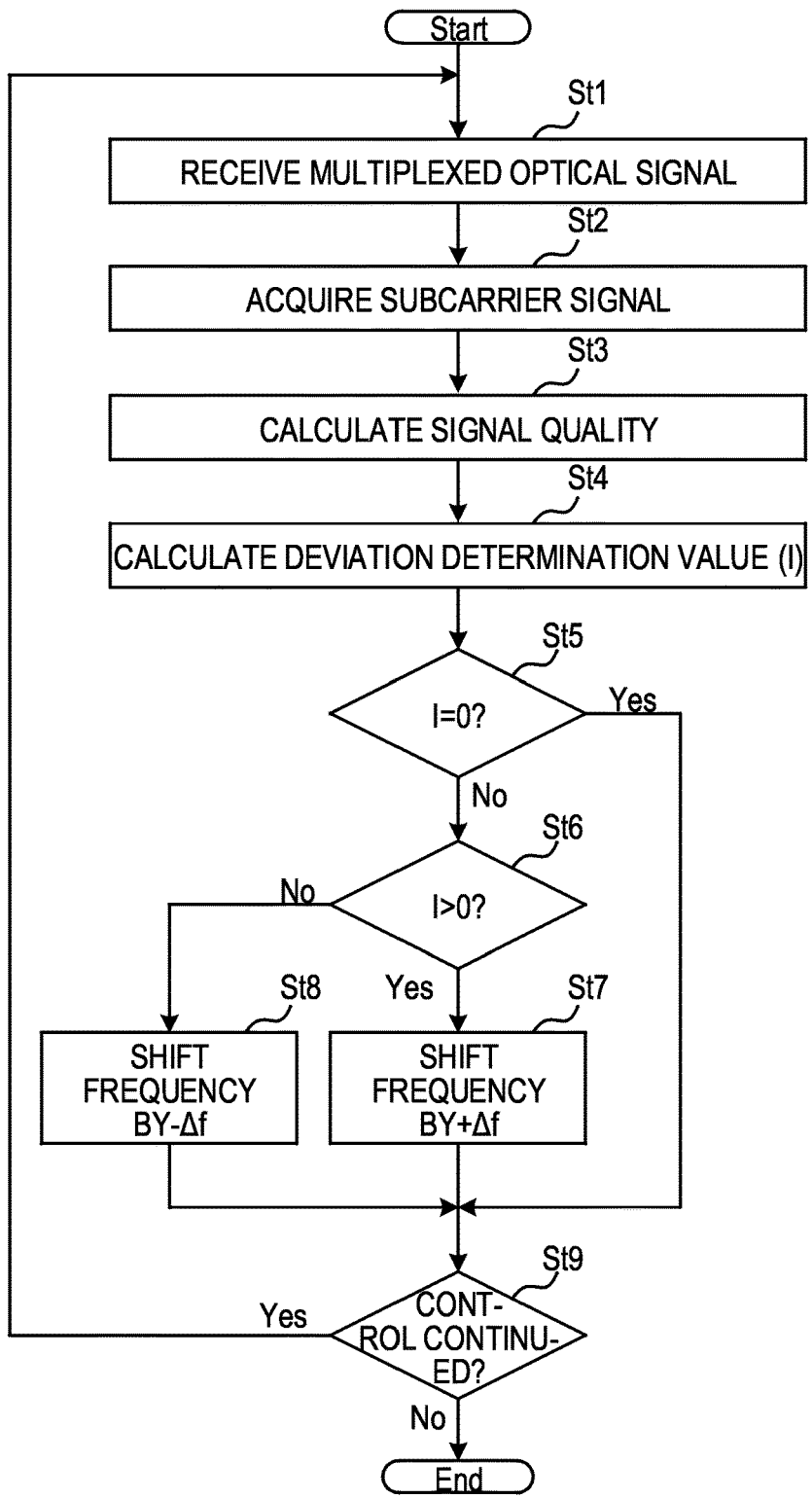
FIG. 9 is a flow chart illustrating an example of a frequency control process by a receiver.

FIG. 9 is a flow chart illustrating an example of a frequency control process by the receiver 20. First, the PDs 203a to 203d receive a multiplexed optical signal Si from the transmitter 10 (Operation SU). Next, the plurality of filters 50 acquire subcarrier signals SC1 to SC8 from the multiplexed optical signal Si (Operation St2).

Next, the signal quality calculators 59 calculate signal qualities C(1) to C(8) of the subcarrier signals SC1 to SC8 (Operation St3). Next, the deviation detector 60 calculates a deviation determination value I from the signal qualities C(1) to C(8) according to, for example, the above equation (5) (Operation St4). The deviation determination value I may be calculated as, without being limited to, for example, a slope of an approximation of the signal qualities C(1) to C(8) to a linear function or a difference in signal qualities C(1) and C(2) between the subcarrier signal SC1 at the lowest frequency side and the subcarrier signal SC8 at the highest frequency side.

Next, the transmission characteristic controller 61 performs a process corresponding to the deviation determination value I. When the deviation determination value I=0 (Yes in Operation St5), without performing the shift control of the frequency fi (Operations St7 and St8), the transmission characteristic controller 61 determines whether to continue the frequency control, based on an instruction from, for example, a network management apparatus (Operation St9). When it is determined that the frequency control is to be ended (No in Operation St9), the transmission characteristic controller 61 ends the process. When it is determined that the frequency control is to be continued (Yes in Operation St9), the transmission characteristic controller 61 repeats the process from Operation St1.

When the deviation determination value I≠0 (No in Operation St5) and the deviation determination value I>0 (Yes in Operation St6), the transmission characteristic controller 61 increases the frequency fi by pitch width Δf (Operation St7), as illustrated in FIG. 6. Next, the transmission characteristic controller 61 performs the operation St7.

When the deviation determination value I<0 (No in Operation St6), the transmission characteristic controller 61 decreases the frequency fi by pitch width Δf (Operation St8), as illustrated in FIG. 7. Next, the transmission characteristic controller 61 performs the operation St9. In this manner, the transmission characteristic controller 61 performs the frequency control.

Since this frequency control is performed in the receiver 20 of each of the multiplexed optical signals S1 to S4, an spacing M of each of the multiplexed optical signals S1 to S4 within the frequency band of the WDM signal Sm is optimized.

Figure 10:
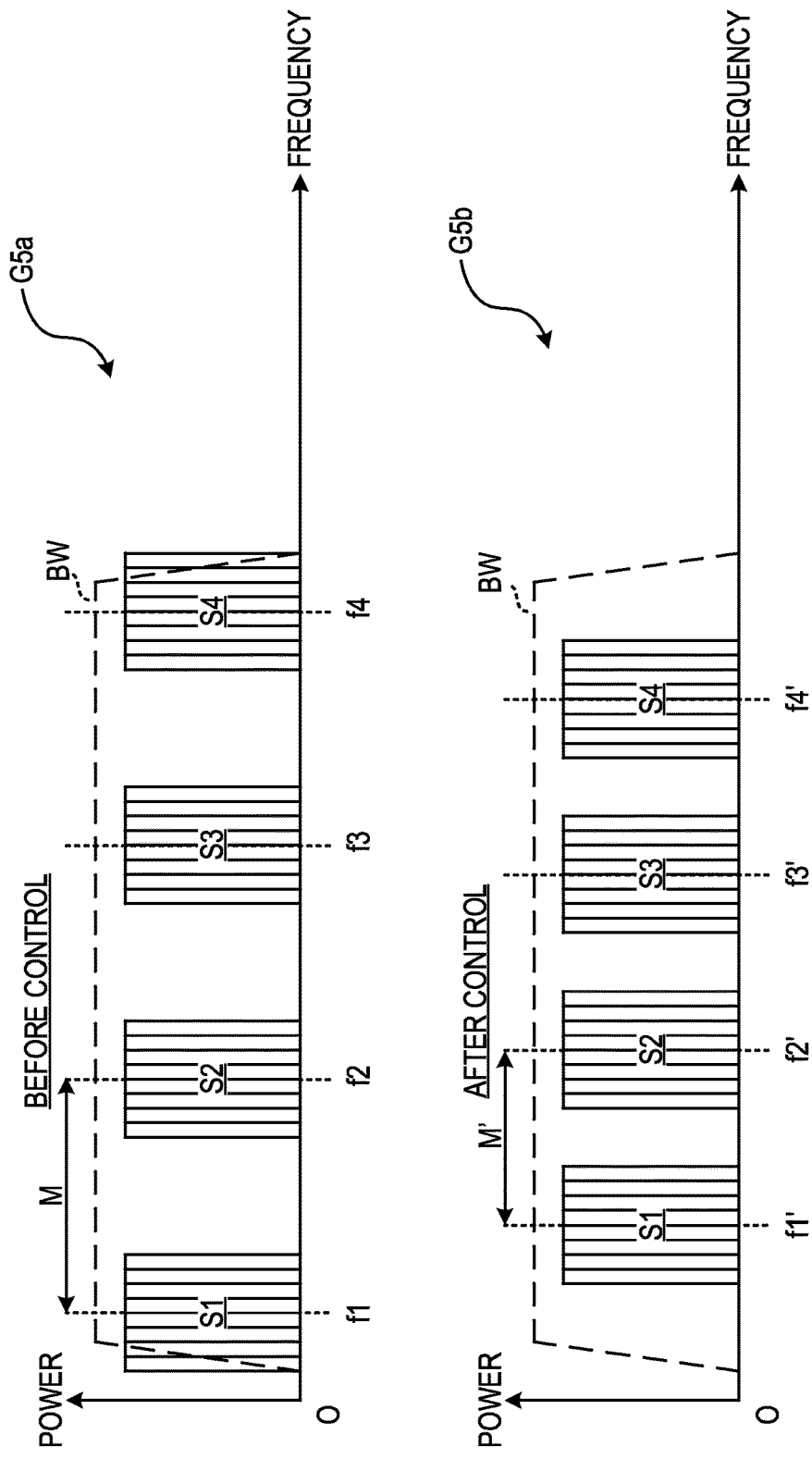
FIG. 10 is a view illustrating an exemplary operation in a case where a frequency spacing is narrowed.

FIG. 10 illustrates an exemplary operation in a case where the frequency spacing M is narrowed. The symbol G5a denotes spectral waveforms of the multiplexed optical signals S1 to S4 before the frequency control, and the symbol G5b denotes spectral waveforms of the multiplexed optical signals S1 to S4 after the frequency control.

The spacing M of the frequencies f1 to f4 of the multiplexed optical signals S1 to S4 before the frequency control is wider than the transmission band BW of the optical filter. Therefore, the spectral waveforms of the multiplexed optical signal S1 at the low frequency side and the multiplexed optical signal S4 at the high frequency side overlap with the edge portion of the transmission band BW of the optical filter, which results in deterioration of the transmission characteristics.

The frequencies f1 to f4 of the multiplexed optical signals S1 to S4 are changed to ft to f4' by the frequency control. Accordingly, the spacing M of the frequencies f1 to f4 is narrowed to M'. Accordingly, the spectral waveforms of the multiplexed optical signal S1 at the low frequency side and the multiplexed optical signal S4 at the high frequency side do not overlap with the edge portion of the transmission band BW of the optical filter, which results in improvement of the transmission characteristics.

Figure 11:
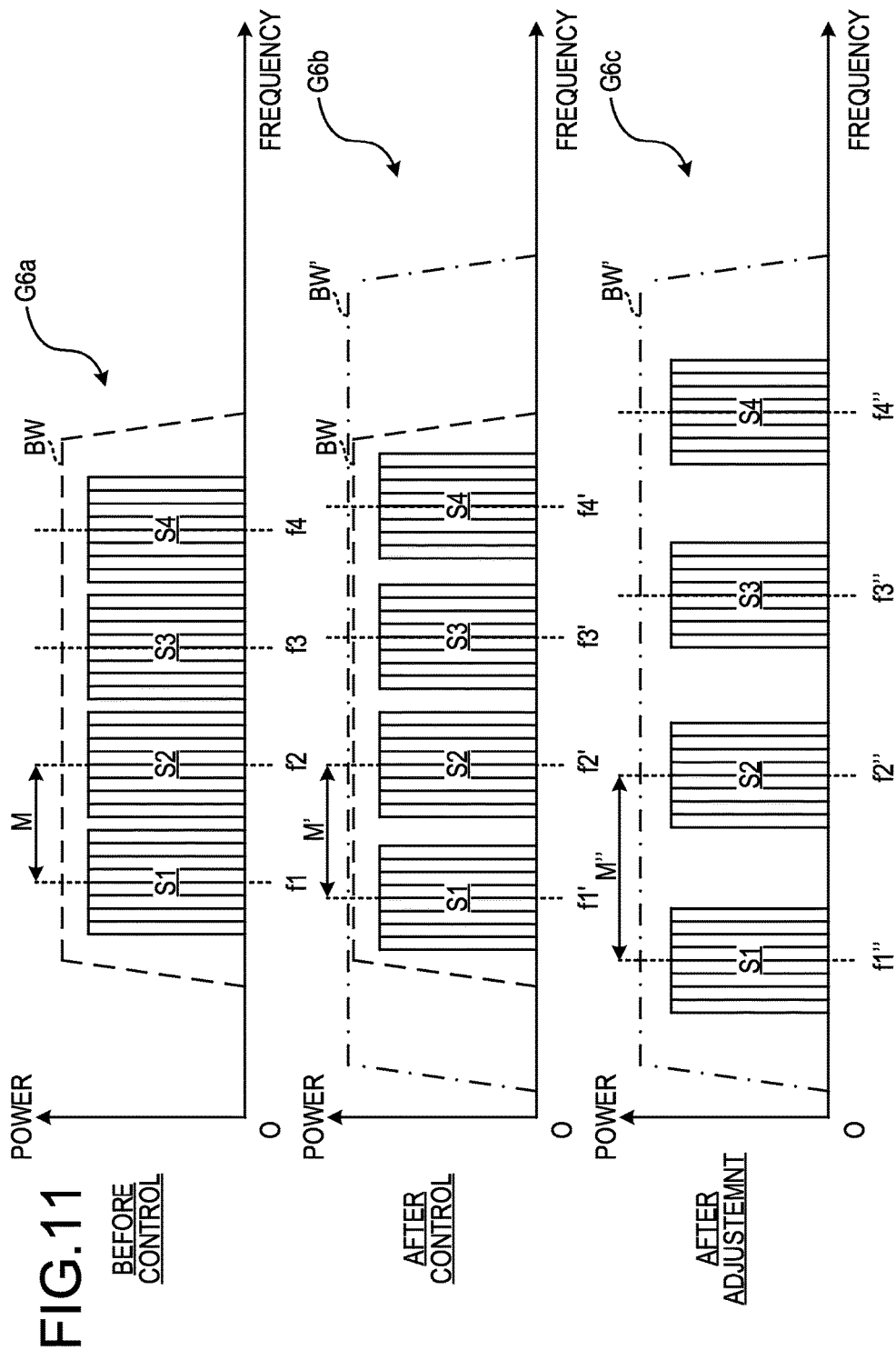
FIG. 11 is a view illustrating an exemplary operation in a case where the frequency spacing is widened, and an exemplary operation of adjustment of the frequency spacing.

FIG. 11 illustrates an exemplary operation in a case where the frequency spacing M is widened, and an exemplary operation of adjustment of the frequency spacing M of the frequencies f1 to f4. The symbol G6a denotes spectral waveforms of the multiplexed optical signals S1 to S4 before the frequency control, and the symbol G6b denotes spectral waveforms of the multiplexed optical signals S1 to S4 after the frequency control. Adjustment of spacing of the frequencies f1 to f4 will be described later.

The spacing M of the frequencies f1 to f4 of the multiplexed optical signals S1 to S4 before the frequency control is narrower than the transmission band BW of the optical filter. Therefore, each of the spectral waveforms of the multiplexed optical signals S1 to S4 is affected by a crosstalk with other adjacent multiplexed optical signals S1 to S4, which results in deterioration of the transmission characteristics.

The frequencies f1 to f4 of the multiplexed optical signals S1 to S4 are changed to fi' to f4' by the frequency control. Accordingly, the spacing M of the frequencies f1 to f4 is widened to M'. Accordingly, the spectral waveforms of the multiplexed optical signals S1 to S4 are not affected by the crosstalk, which results in an improvement of the transmission characteristics.

In this manner, in this embodiment, the plurality of signal quality calculators 59 calculates the signal qualities C(1) to C(8) of the plurality of subcarrier signals SC1 to SC8, respectively, and the deviation detector 60 detects a deviation of the signal qualities C(1) to C(8) between the plurality of subcarrier signals SC1 to SC8. In addition, the transmission characteristic controller 61 performs the control of the frequency fi of the transmission light LDs for the optical source 101 of the transmitter 10 based on the deviation of the signal qualities C(1) to C(8) detected by the deviation detector 60.

Accordingly, the transmission characteristic controller 61 may optimally control the spacing M between the multiplexed optical signals S1 to S4 based on the deviation of the signal qualities C(1) to C(8) of the plurality of subcarrier signals SC1 to SC8. Therefore, the transmission characteristics are improved. In addition, according to the control method of this embodiment, it is possible to easily control the spacing M of the frequencies f1 to f4 without using an expensive equipment such as an optical spectrum analyzer, and a complicated control system.

In this embodiment, when the optical filter has a transmission band BW' wider than the above-mentioned transmission band BW, it is possible to further improve the transmission characteristics by further widening the spacing M' of the frequencies fi' to f4'. In this case, after the above-described control of the spacing M' of the frequencies f1 to f4, the transmission characteristic controller 61 adjusts the spacing M' of the frequencies fi' to f4' such that an average of the signal qualities C(1) to C(8) is increased.

The symbol G6c denotes spectral waveforms of the multiplexed optical signals S1 to S4 after adjusting the spacing M' of the frequencies fi' to f4'. After performing the control indicated by the symbol G6b, the transmission characteristic controller 61 determines that the optical filter has a wide transmission band BW', and changes the spacing M' to a wider spacing M" by changing the frequencies fi' to f4' to frequencies f1" to f4" such that the average of the signal qualities C(1) to C(8) is increased. Accordingly, for example, since a nonlinear phase noise due to a Kerr effect during the fiber transmission between the multiplexed optical signals S1 to S4 is reduced, the transmission characteristics of the multiplexed optical signals S1 to S4 are further improved.

When the deviation of the signal qualities C(1) to C(8) is not detected, that is, when the deviation determination value I=0, the transmission characteristic controller 61 determines the area of the transmission band BW' based on a difference in signal qualities C(1) to C(8) between the subcarrier signals SC1 to SC8 in the central and edge portions within the frequency band of the multiplexed optical signals S1 to S4. Hereinafter, a process of adjusting the spacing M' of the frequencies f1' to f4' is described.

Figure 12:
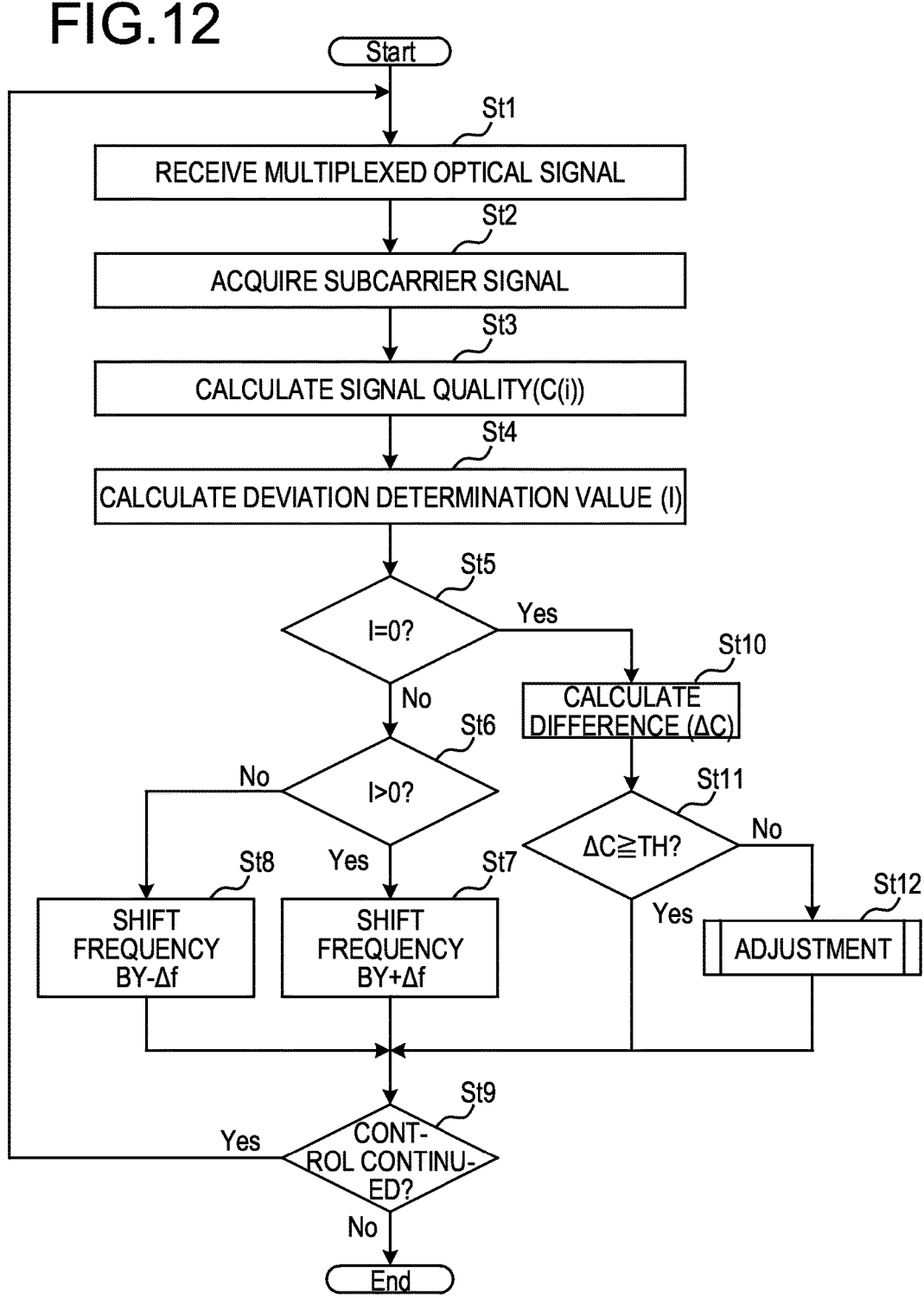
FIG. 12 is a flow chart illustrating another example of the frequency control process by the receiver.

FIG. 12 is a flow chart illustrating another example of the frequency control process by the receiver 20. In FIG. 12, the same processes as those in FIG. 9 will be denoted by the same reference numerals as used in FIG. 9, and explanation thereof will be omitted.

When the deviation determination value I=0 (Yes in Operation St5), that is, when no deviation of the signal qualities C(1) to C(8) is detected, the deviation detector 60 calculates a difference ΔC in signal qualities C(1) to C(8) between the subcarrier signals SC1 to SC8 in the central and edge portions within the frequency band of the multiplexed optical signal Si (Operation St10). The difference ΔC may be, for example, the average of C(4) to C(1) and C(5) to C(8).

A subcarrier signal (e.g., SC1 and SC8) closer to the edge portion in the frequency band of the multiplexed optical signal Si is more affected by the edge portion of the transmission band BW of the optical filter or an adjacent multiplexed optical signal Si. Therefore, the transmission characteristic controller 61 may determine the size of the transmission band BW of the optical filter based on the difference ΔC.

Figure 13:
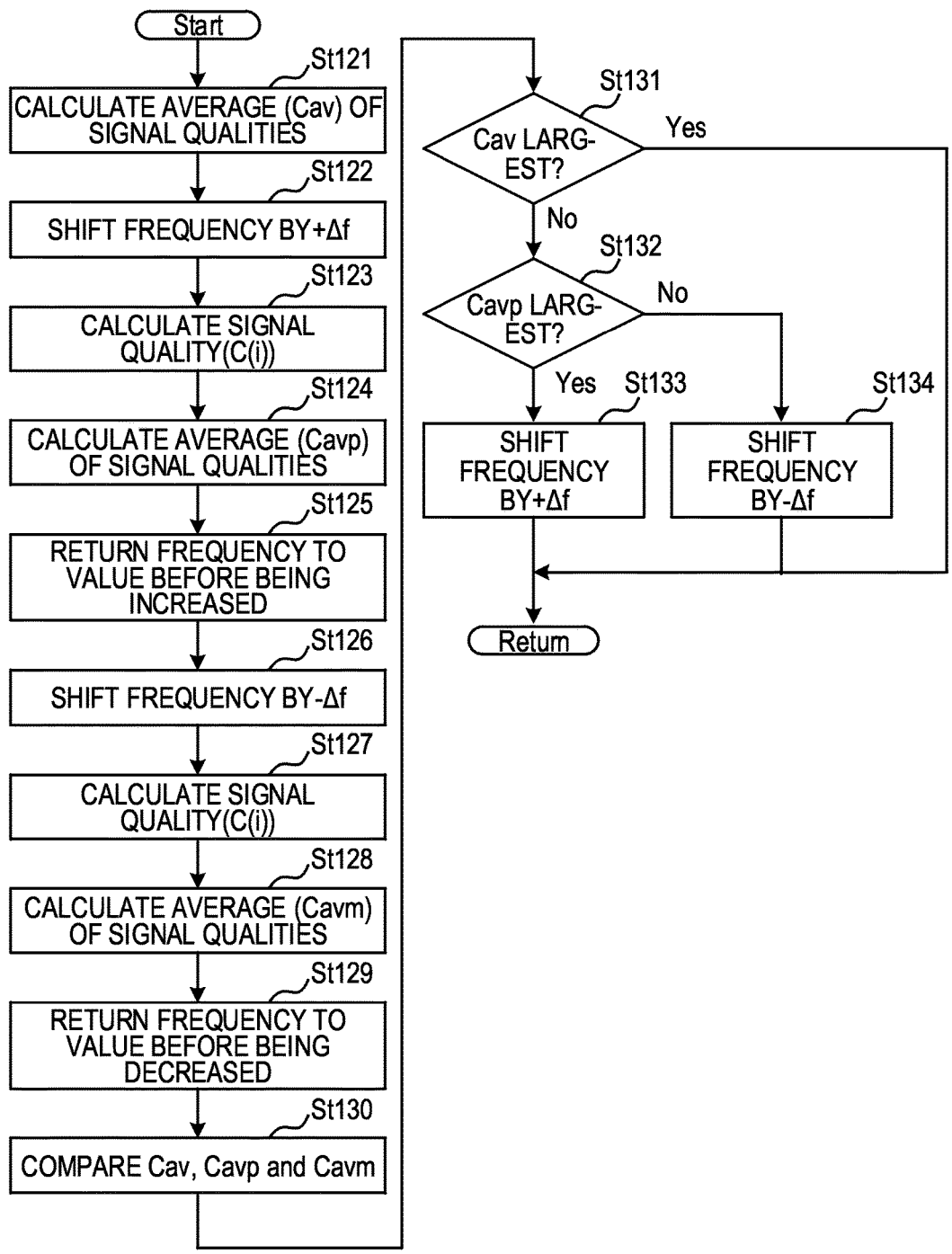
FIG. 13 is a flow chart illustrating an example of a frequency spacing adjusting process.

To this end, the transmission characteristic controller 61 compares the difference ΔC with a predetermined value TH (Operation St11). The predetermined value TH is determined depending on the characteristics of the transmitter 10 and receiver 20. When the difference ΔC≥TH (Yes in Operation St11), the transmission characteristic controller 61 determines that the transmission band BW of the optical filter is narrow, and does not adjust the spacing M of the frequencies f1 to f4. Meanwhile, when the difference ΔC<TH (No in Operation St11), the transmission characteristic controller 61 performs a process of adjusting the spacing M of the frequencies f1 to f4, as illustrated in FIG. 13 (Operation St12). In this manner, the receiver 20 performs the frequency control process.

FIG. 13 is a flow chart illustrating an example of a process of adjusting the spacing M of the frequencies f1 to f4. In this process, the transmission characteristic controller 61 changes the frequency fi to determine the frequency fi such that the average of the signal qualities C(1) to C(8) becomes maximal.

$$Cav = \frac{\sum_{i=1}^{n} C(i)}{\sum_{i=1}^{n} i} \quad (6)$$

The transmission characteristic controller 61 calculates a current average Cav of the signal qualities C(1) to C(8) of the subcarrier signals SC1 to SC8 (Operation St121). The average Cav is calculated from, for example, the above equation (6).

Next, the transmission characteristic controller 61 increases the frequency fi by pitch width Δf (Operation St122). Next, the transmission characteristic controller 61 calculates the signal qualities C(1) to C(8) of the subcarrier signals SC1 to SC8 (Operation St123), and then, calculates an average Cavp thereof (Operation St124). The average Cavp is calculated from, for example, the above equation (6). Next, the transmission characteristic controller 61 returns the frequency fi to a value before being increased (Operation St125).

Next, the transmission characteristic controller 61 decreases the frequency fi by pitch width Δf (Operation St126). Next, the transmission characteristic controller 61 calculates the signal qualities C(1) to C(8) of the subcarrier signals SC1 to SC8 (Operation St127), and then, calculates an average Cavm thereof (Operation St128). The average Cavm is calculated from, for example, the above equation (6). Next, the transmission characteristic controller 61 returns the frequency fi to a value before being decreased (Operation St129).

Next, the transmission characteristic controller 61 compares the current average Cav of the signal qualities C(1) to C(8), the average Cavp in the frequency increase (+Δf) and the average Cavm in the frequency decrease (−Δf) (Operation St130). When the current average Cav is the maximum (Yes in Operation St131), the transmission characteristic controller 61 determines that there is no possibility of improving the transmission characteristics and does not adjust the spacing M of the frequencies f1 to f4.

When the average Cavp in the frequency increase is the maximum (No in Operation St131 and Yes in Operation St132), the transmission characteristic controller 61 increases the frequency fi by pitch width Δf (Operation St133), and then, ends the process. In addition, when the average Cavm in the frequency decrease is the maximum (No in Operation St131 and No in Operation St132), the transmission characteristic controller 61 decreases the frequency fi by pitch width Δf (Operation St134), and then, ends the process. In this manner, the process of adjusting the spacing M of the frequencies f1 to f4 is performed.

In this way, when the difference ΔC of the signal qualities C(1) to C(8) is smaller than the predetermined value TH, the transmission characteristic controller 61 controls the frequency f1 of the transmission light LDs for the optical source 101 so as to increase the average of the signal qualities C(1) to C(8). Accordingly, for example, since a nonlinear phase noise between the multiplexed optical signals S1 to S4 is reduced, the transmission characteristics of the multiplexed optical signals S1 to S4 are further improved.

Although it has been illustrated in this embodiment that the transmission characteristic controller 61 optimizes the spacing of the multiplexed optical signals S1 to S4 by controlling the frequencies f1 to f4, the present disclosure is not limited thereto. For example, the transmission characteristic controller 61 may optimize the spacing of the multiplexed optical signals S1 to S4 by controlling a multi-value level of modulation of the subcarrier signals SC1 to SC8.

Figure 14:
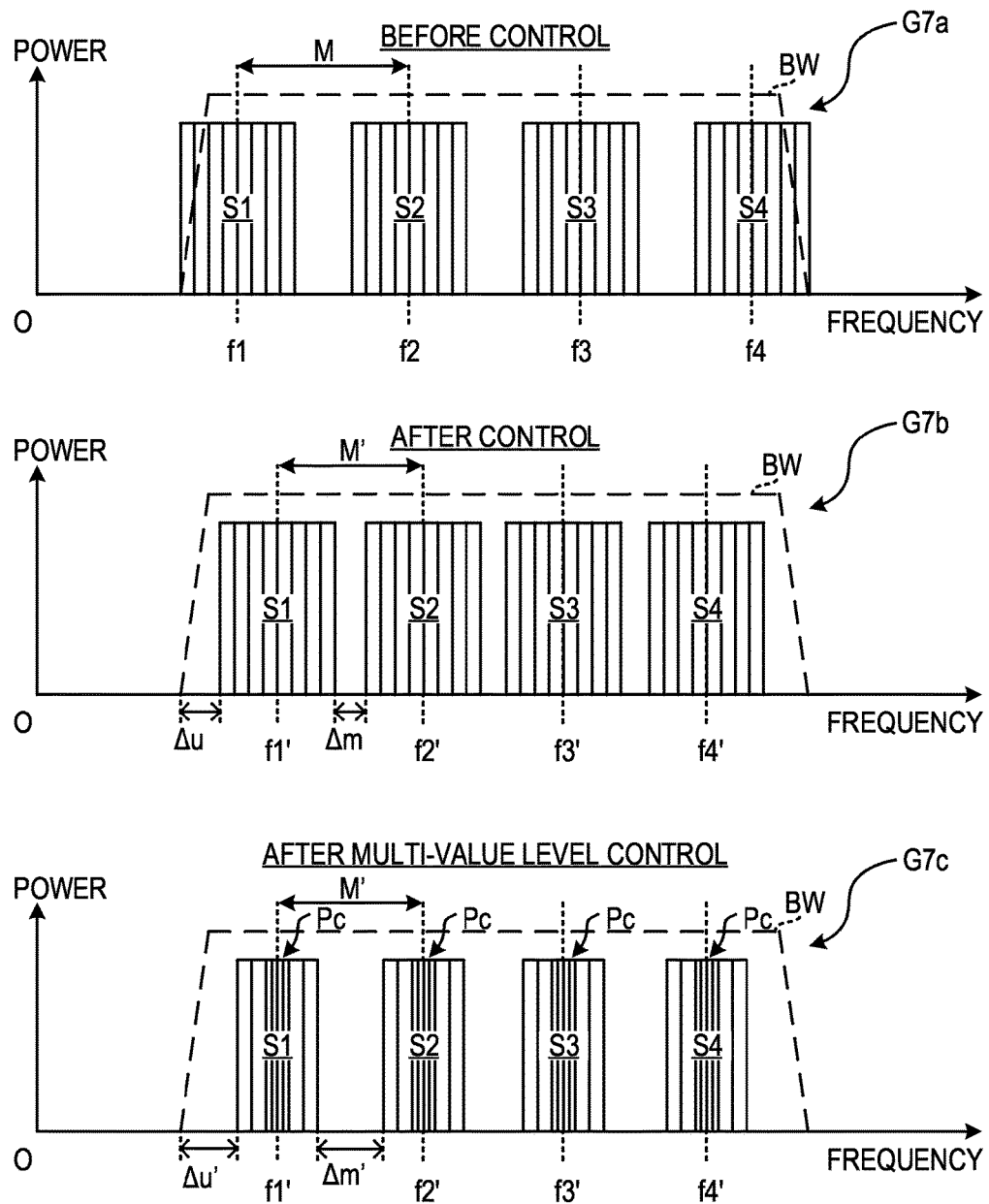
FIG. 14 is a view illustrating an exemplary operation in a case where a multi-value level is increased.

FIG. 14 illustrates an exemplary operation in a case where a multi-value level is increased. The symbol G7a denotes spectral waveforms of the multiplexed optical signals S1 to S4 before the frequency control, and the symbol G7b denotes spectral waveforms of the multiplexed optical signals S1 to S4 after the frequency control.

In this example, since the transmission band BW of the optical filter is narrow, an spacing Δm between the bands of the multiplexed optical signals S1 to S4 after the frequency control, and an spacing Δu between the spectral waveforms of the multiplexed optical signals S1 and S4 at the edge portion and the transmission band BW of the optical filter are small. Therefore, the transmission characteristic controller 61 optimizes the spacing Δm and Δu by increasing a multi-value level of modulation of the subcarrier signals SC3 to SC6 in the central portion after the frequency control, and reducing the bandwidth of the multiplexed optical signal Si.

The symbol G7c denotes spectral waveforms of the multiplexed optical signals S1 to S4 after the multi-value level control. The transmission characteristic controller 61 determines the size of the transmission band BW of the optical filter from the difference ΔC of the signal qualities C(1) to C(8). When it is determined that the transmission band BW of the optical filter is narrow, the transmission characteristic controller 61 increases the multi-value level of modulation of the subcarrier signals SC3 to SC6 in the central portion Pc and reduces the bandwidth of the multiplexed optical signal Si. The object to be subjected to the multi-value level control is not limited to the subcarrier signals SC3 to SC6 in the central portion Pc. For example, only the subcarrier signals SC3 and SC5 may be selected as objects to be subjected to the multi-value level control.

The subcarrier signals SC1 to SC8 are modulated by the modulators 41 of the transmitter 10, respectively. Therefore, the transmission characteristic controller 61 includes the control information of the multi-value level in the control signal Sc and transmits the information to the transmitter 10. In the transmitter 10, the transmission controller 45 controls the modulators 41 by outputting the setting signals Ka1 to Ka8 based on the control information. Further, the transmission controller 45 controls the filters 42 and the frequency shifters 43 based on the multi-value level of modulation. In addition, the reception controller 58 controls the filters 50, the frequency shifters 51, and the identifier 563 based on the multi-value level of modulation.

Accordingly, since the spacing Δm and Δu are increased to be optimized, it is possible to obtain the optimal transmission characteristics according to the transmission band BW of the optical filter.

Figure 15:
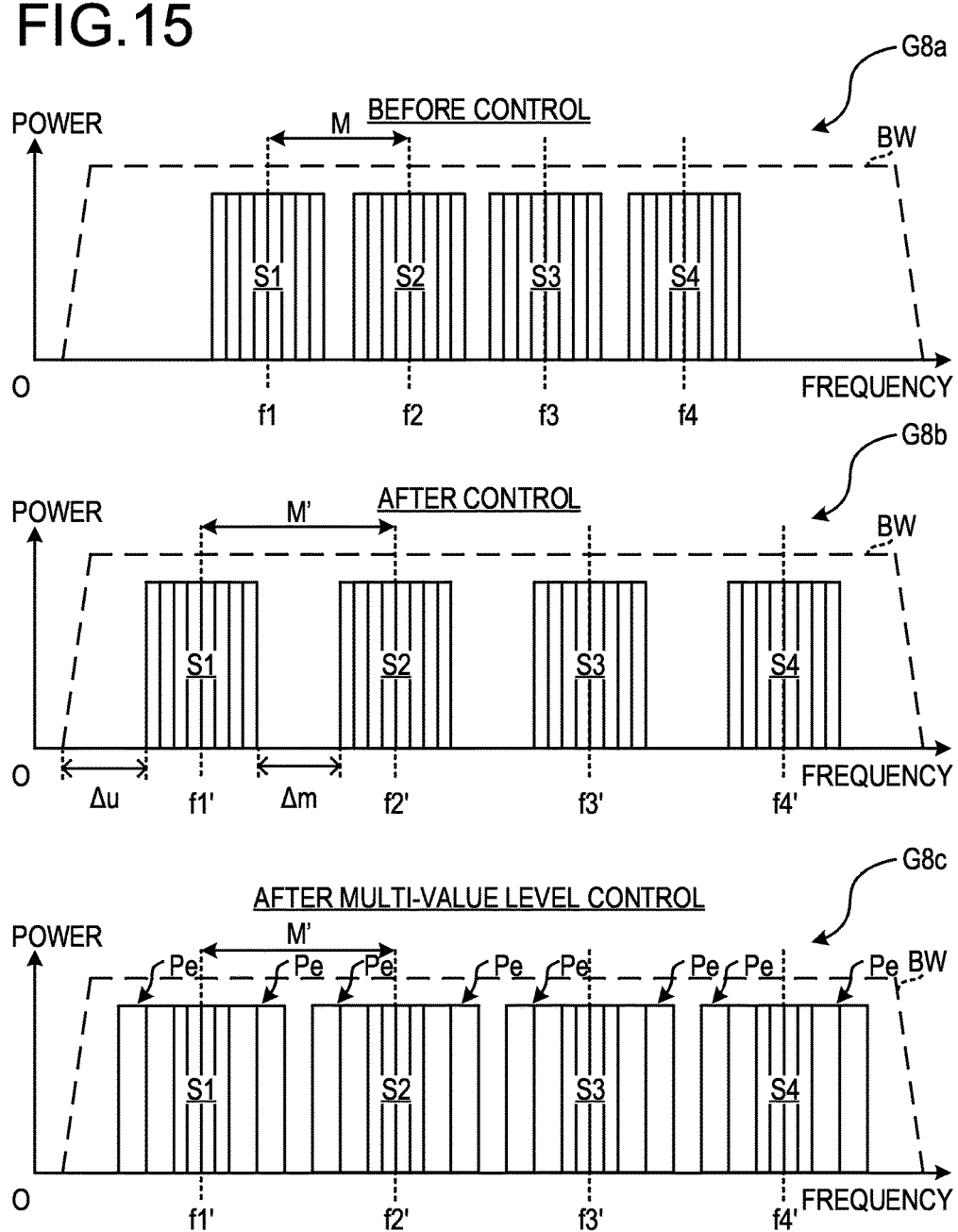
FIG. 15 is a view illustrating an exemplary operation in a case where the multi-value level is decreased.

FIG. 15 illustrates an exemplary operation in a case where a multi-value level is decreased. The symbol G8a denotes spectral waveforms of the multiplexed optical signals S1 to S4 before the frequency control, and the symbol G8b denotes spectral waveforms of the multiplexed optical signals S1 to S4 after the frequency control. The symbol G8c denotes spectral waveforms of the multiplexed optical signals S1 to S4 after the multi-value level control.

In this example, since the transmission band BW of the optical filter is wide, spacing Δm between the bands of the multiplexed optical signals S1 to S4 and spacing Δu between the spectral waveforms of the multiplexed optical signals S1 and S4 at the edge portion and the transmission band BW of the optical filter are large. Therefore, in order to effectively utilize the bands, the transmission characteristic controller 61 decreases the multi-value level of modulation of the subcarrier signals SC1, SC2, SC7, and SC8 at the edge portion Pe and widens the bandwidth of the multiplexed optical signal Si. The object to be subjected to the multi-value level control is not limited to the subcarrier signals SC1, SC2, SC7, and SC8 in the edge portion Pe. For example, only the subcarrier signals SC1 and SC8 may be selected as objects to be subjected to the multi-value level control.

At this time, like the case where the multi-value level is increased, the transmission characteristic controller 61 outputs the control information of the multi-value level to the transmission controller 45 and the reception controller 58. The transmission controller 45 controls the modulators 41 and so on based on the control information, and the reception controller 58 controls the identifiers 56 and so on based on the control information.

Accordingly, since the subcarrier signals SC1, SC2, SC7, and SC8 in the edge portion Pe are decreased in terms of multi-value level of modulation, their bandwidths are increased, which results in improvement of the transmission characteristics. Hereinafter, the multi-value level control is described in detail.

Figure 16:
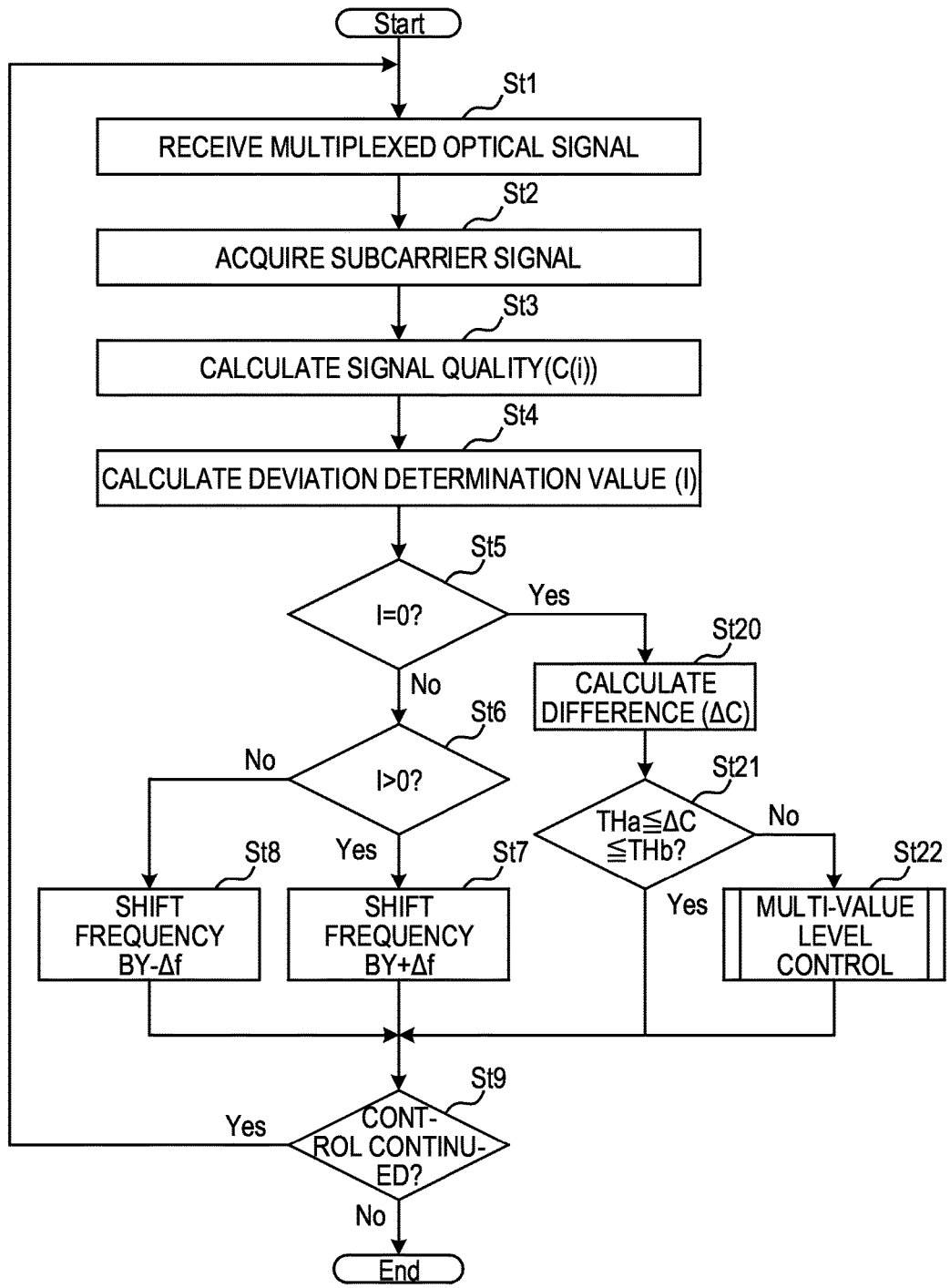
FIG. 16 is a flow chart illustrating another example of the frequency control process by the receiver.

FIG. 16 is a flow chart illustrating another example of the frequency control process by the receiver 20. In FIG. 16, the same processes as those in FIG. 9 will be denoted by the same reference numerals as used in FIG. 9, and explanation thereof will be omitted.

When the deviation determination value I=0 (Yes in Operation St5), that is, when no deviation of the signal qualities C(1) to C(8) is detected, the deviation detector 60 calculates a difference ΔC in signal qualities C(1) to C(8) between the subcarrier signals SC1 to SC8 in the central and edge portions within the frequency band of the multiplexed optical signal Si (Operation St20). Like the example of FIG. 11, the transmission characteristic controller 61 determines the size of the transmission band BW of the optical filter based on the difference ΔC.

The transmission characteristic controller 61 compares the difference ΔC with a first threshold THa and a second threshold THb (Operation St21). The first threshold THa and the second threshold THb are determined depending on the characteristics of the transmitter 10 and the receiver 20. When THa≤ΔC≤THb (Yes in Operation St21), the transmission characteristic controller 61 determines that the transmission band BW of the optical filter falls within a proper range, and does not perform the multi-value level control.

Figure 17:
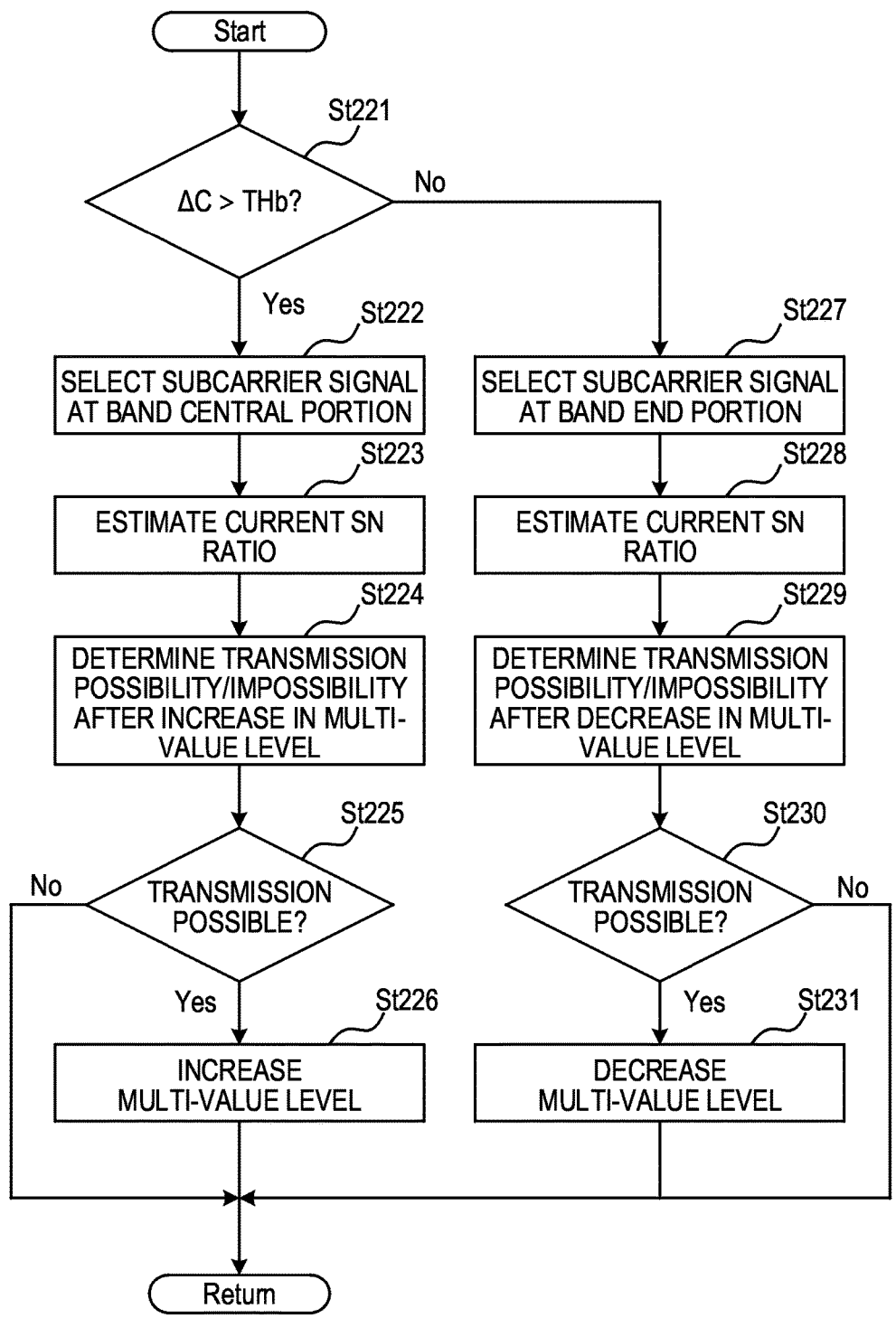
FIG. 17 is a flow chart illustrating an example of a multi-value level control process.

Meanwhile, when ΔC<THa or ΔC>THb (No in Operation St21), the transmission characteristic controller 61 performs the multi-value level control illustrated in FIG. 17 (Operation St22). In this manner, the receiver 20 performs the frequency control process.

FIG. 17 is a flow chart illustrating an example of a multi-value level control process. In this example, as an example, before changing the multi-value level of modulation, the transmission characteristic controller 61 determines whether transmission of the multiplexed optical signal Si in a modulated multi-value level is possible or impossible, by referring to the transmission characteristic table held in the memory 62 of the receiver 20.

When ΔC>THb (Yes in Operation St221), the transmission characteristic controller 61 selects the subcarrier signals SC3 to SC6 in the central portion Pc of the multiplexed optical signal Si, as objects to be subjected to the multi-value level control (Operation St222). At this time, the transmission characteristic controller 61 selects subcarrier signals, which are closer to the central portion Pc of the frequency band of the multiplexed optical signal Si and have a low multi-value level of modulation, among the subcarrier signals SC1 to SC8.

Next, the transmission characteristic controller 61 estimates a current SN ratio of the selected subcarrier signals SC3 to SC6 by referring to the transmission characteristic table held in the memory 62 (Operation St223). Next, the transmission characteristic controller 61 determines whether transmission of the subcarrier signals SC3 to SC6 after the increase of the multi-value level is possible or impossible, by referring to the transmission characteristic table (Operation St224).

FIG. 18 illustrates an example of the transmission characteristic table. The transmission characteristic table is an example of a table in which the signal quality C(i), SN ratio, and transmission possibility/impossibility information of the subcarrier signals SC1 to SC8 are registered in association for each multi-value level of modulation. The transmission possibility/impossibility information (see "transmission possibility/impossibility") indicates possibility/impossibility of transmission of the subcarrier signals SC1 to SC8 as OK (possible transmission) or NG (impossible transmission) based on a measurement obtained in advance by a transmission test or a transmission simulation.

For example, when the current signal quality C(i) is "14," and the current multi-value level is "2," a corresponding SN ratio is estimated as "16," as indicated by a symbol X1, in the operation St223 and an operation St228 to be described later. Here, when the multi-value level is increased to "3," the transmission possibility/impossibility information corresponding to the multi-value level "3" and the SN ratio "16" indicates "OK" as indicated by a symbol X2. Accordingly, when the signal quality C(i) is "14" and the multi-value level is increased from "2" to "3," the subcarrier signals SC1 to SC8 may be transmitted.

Meanwhile, when the multi-value level is increased to "4," the transmission possibility/impossibility information corresponding to the multi-value level "4" and the SN ratio "16" indicates "NG" as indicated by a symbol X3. Accordingly, when the signal quality C(i) is "14" and the multi-value level is increased from "2" to "4," the subcarrier signals SC1 to SC8 may not be transmitted.

In this manner, the transmission characteristic controller 61 acquires the transmission possibility/impossibility information corresponding to the signal quality C(i) of the subcarrier signals in an increased multi-value level by referring to the transmission characteristic table. Therefore, the transmission characteristic controller 61 may avoid the deterioration of the transmission characteristics due to the increase of the multi-value level.

Referring back to FIG. 17, when the transmission possibility/impossibility information indicates OK (possible transmission) (Yes in Operation St225), the transmission characteristic controller 61 increases the multi-value level of modulation of the corresponding subcarrier signals SC3 to SC6 (Operation St226). At this time, the transmission characteristic controller 61 includes the control information indicating the control contents of the multi-value level of modulation in the control signal Sc and transmits the information to the transmitter 10.

Meanwhile, when the transmission possibility/impossibility information indicates NG (impossible transmission) (No in Operation St225), the transmission characteristic controller 61 ends the process without performing the multi-value level control. In addition, when the number of the subcarrier signals SC1 to SC8 to be subjected to the multi-value level control is two or more, the transmission characteristic controller 61 may increase the multi-value level depending on individual results of transmission possibility/impossibility. When the number of subcarrier signals SC1 to SC8 of impossible transmission is one or more, the transmission characteristic controller 61 may stop the multi-value level control.

In this manner, when the difference ΔC of the signal qualities C(1) to C(8) is larger than the second threshold THb, the transmission characteristic controller 61 controls the modulators 41 of the transmitter 10 to increase the multi-value level of modulation. Therefore, symbol rates of the subcarrier signals SC1 to SC8 to be subjected to the multi-value level control are decreased, and their bandwidths are reduced. Accordingly, since the spacing Δm of the band of the multiplexed optical signals S1 to S4 and the spacing Δu between the spectral waveforms of the multiplexed optical signals S1 and S4 at the edge portion and the transmission band BW of the optical filter are optimized, the optimal transmission characteristics may be obtained according to the transmission band BW of the optical filter.

In addition, the transmission characteristic controller 61 controls the modulators 41 corresponding to the subcarrier signals SC3 to SC6 at the central portion Pc to increase the multi-value level of modulation. Therefore, by lowering the transmission characteristics of the subcarrier signals SC3 to SC6 at the central portion Pc having the signal quality C(i) higher than the edge portion Pe, it is possible to optimize the overall transmission characteristics of the multiplexed optical signal Si. In addition, unlike this embodiment, the transmission characteristic controller 61 may select other subcarrier signals SC3 to SC6 as objects to be subjected to the multi-value level control.

In addition, the transmission characteristic controller 61 acquires the transmission possibility/impossibility information corresponding to the signal quality C(i) of the subcarrier signals SC3 to SC6 at the central portion Pc in the increased multi-value level by referring to the transmission characteristics table. When the transmission possibility/impossibility information indicates possible transmission, the transmission characteristic controller 61 controls the modulators 41 corresponding to the subcarrier signals SC3 to SC6 at the central portion Pc to increase the multi-value level of modulation. Therefore, the transmission characteristic controller 61 may avoid the deterioration of the transmission characteristics of the multiplexed optical signal Si due to the increase of the multi-value level.

In addition, when ΔC<THa (No in Operation St221), the transmission characteristic controller 61 selects the subcarrier signals SC1, SC2, SC7, and SC8 at the edge portion Pe of the multiplexed optical signal Si as objects to be subjected to the multi-value level control (Operation St227). At this time, the transmission characteristic controller 61 selects subcarrier signals, which are closer to the edge portion Pe of the frequency band of the multiplexed optical signal Si and have a higher multi-value level of modulation, among the subcarrier signals SC1 to SC8.

Next, the transmission characteristic controller 61 estimates the current SN ratio of the selected subcarrier signals SC1, SC2, SC7, and SC8 by referring to the transmission characteristic table held in the memory 62 (Operation St228). Next, the transmission characteristic controller 61 determines whether transmission of the subcarrier signals SC1, SC2, SC7, and SC8 after being increased in multi-value level is possible or impossible, by referring to the transmission characteristic table (Operation St229). The determination on the possibility/impossibility of transmission is as described above with reference to FIG. 18.

When the transmission possibility/impossibility information indicates OK (possible transmission) (Yes in Operation St230), the transmission characteristic controller 61 performs the control to decrease the multi-value level of modulation of the corresponding subcarrier signals SC1, SC2, SC7, and SC8 (Operation St231). At this time, the transmission characteristic controller 61 includes the control information indicating the control contents of the multi-value level of modulation in the control signal Sc and transmits the information to the transmitter 10.

Meanwhile, when the transmission possibility/impossibility information indicates NG (impossible transmission) (No in Operation St230), the transmission characteristic controller 61 ends the process without performing the multi-value level control. In addition, when the number of subcarrier signals SC1 to SC8 to be subjected to multi-value level control is two or more, the transmission characteristic controller 61 may decrease the multi-value level depending on individual results of transmission possibility/impossibility. When the number of subcarrier signals SC1 to SC8 of impossible transmission is one or more, the transmission characteristic controller 61 may stop the multi-value level control.

In this manner, when the difference ΔC of the signal qualities C(1) to C(8) is smaller than the first threshold THa, the transmission characteristic controller 61 controls the modulators 41 of the transmitter 10 to increase the multi-value level of modulation. Therefore, the symbol rates of the subcarrier signals SC1 to SC8 to be subjected to the multi-value level control are increased, and their bandwidths are widened. Accordingly, since the spacing Δm of the band of the multiplexed optical signals S1 to S4 and the spacing Δu between the spectral waveforms of the multiplexed optical signals S1 and S4 at the edge portion and the transmission band BW of the optical filter are optimized, it is possible to obtain the optimal transmission characteristics according to the transmission band BW of the optical filter.

In addition, the transmission characteristic controller 61 controls the modulators 41 corresponding to the subcarrier signals SC1, SC2, SC7, and SC8 at the edge portion Pe to increase the multi-value level of modulation. Therefore, by improving the transmission characteristics of the subcarrier signals SC1, SC2, SC7, and SC8 at the edge portion Pe having the signal quality C(i) lower than the central portion Pc, it is possible to optimize the overall transmission characteristics of the multiplexed optical signal Si. In addition, unlike this embodiment, the transmission characteristic controller 61 may select other subcarrier signals SC1 to SC8 as objects to be subjected to the multi-value level control.

In addition, the transmission characteristic controller 61 acquires the transmission possibility/impossibility information corresponding to the signal quality C(i) of the subcarrier signals SC1, SC2, SC7, and SC8 at the edge portion Pe in the decreased multi-value level by referring to the transmission characteristics table. When the transmission possibility/impossibility information indicates possible transmission, the transmission characteristic controller 61 controls the modulators 41 corresponding to the subcarrier signals SC1, SC2, SC7, and SC8 at the edge portion Pe to decrease the multi-value level of modulation. Therefore, the transmission characteristic controller 61 may avoid the deterioration of the transmission characteristics of the multiplexed optical signal Si due to the decrease of the multi-value level.

In the above-described embodiment, the transmission characteristic controller 61 performs the transmission characteristic control based on the data signal Di of a network at a user side. However, the present disclosure is not limited thereto. For example, the transmission characteristic control may be performed based on a pilot signal generated in the transmitter 10. The pilot signal is a test signal where a fixed pattern of data is superimposed, which is unlike the data signal Di. In this case, the configuration of the transmitter 10 is described below.

Figure 19:
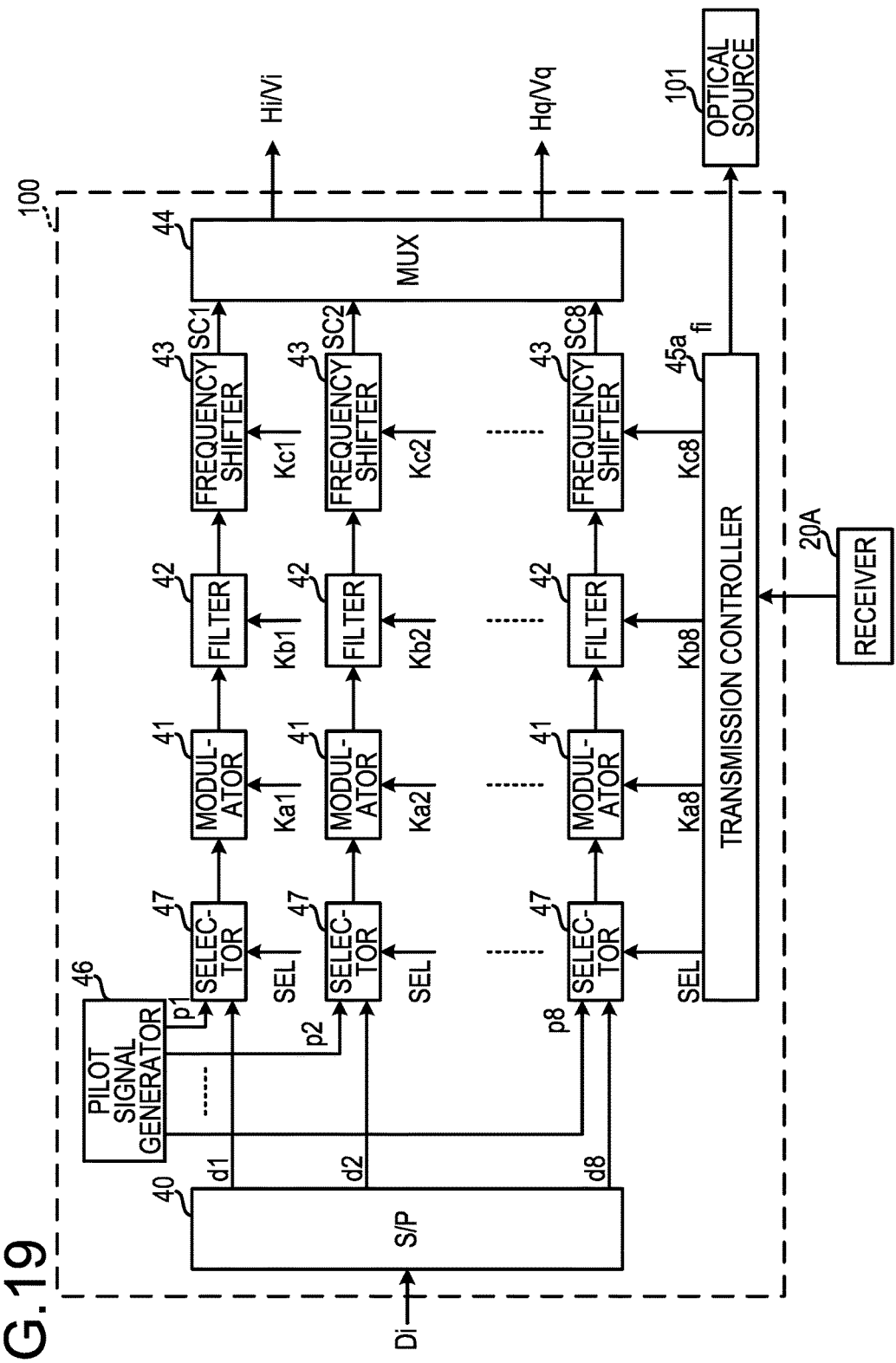
FIG. 19 is a view illustrating another exemplary configuration of the transmission processing circuit.

FIG. 19 is a view illustrating another exemplary configuration of the transmission processing circuit 100. In FIG. 19, the same elements as those in FIG. 3 will be denoted by the same reference numerals as used in FIG. 3, and explanation thereof will be omitted.

The transmission processing circuit 100 includes a transmission controller 45a, a serial-parallel conversion circuit (S/P) 40, a pilot signal generator 46, a plurality of selectors 47, a plurality of modulators 41, a plurality of filters 42, a plurality of frequency shifters 43, and a multiplexer (MUX) 44. The selectors 47, the modulators 41, the filters 42, and the frequency shifters 43 are provided as many as the subcarrier signals SC1 to SC8.

The pilot signal generator 46 generates a pilot signal where a fixed pattern of data is superimposed and parallelizes the pilot signal into parallel signals p1 to p8 which are then output to the plurality of selectors 47, respectively. The selectors 47 are, for example, selector circuits and select the parallel signals p1 to p8 of the pilot signal or the parallel signals dl or d8 of the data signal Di according to a select signal SEL from the transmission controller 45a, which are then output to the modulators 41. Accordingly, a signal to be transmitted to the receiver 20 is switched.

The transmission controller 45a outputs the select signal SEL to each of the selectors 47. The select signal SEL is shared between the plurality of selectors 47. The transmission controller 45a may output the select signal SEL such that the pilot signal is selected, for example, before the transmission apparatuses 1 and 2 start to be operated, that is, before the data signal Di begins to flow. In this case, prior to the start of operation, the transmission characteristics between the transmitter 10 and the receiver 20 may be adjusted.

In addition, during the operation of the transmission apparatuses 1 and 2, the transmission controller 45a may output the select signal SEL such that the pilot signals flow regularly.

Figure 20:
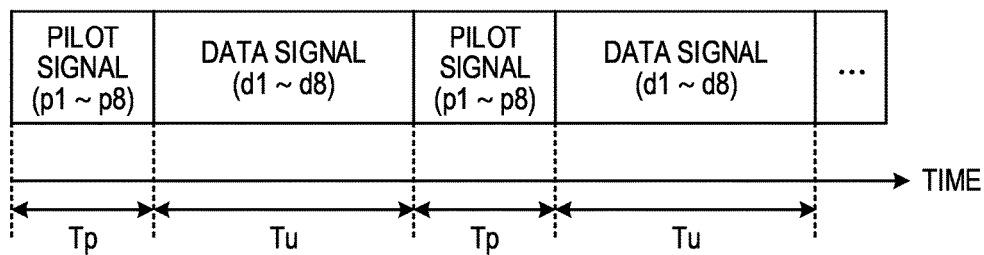
FIG. 20 is a time chart illustrating an example of a transmission operation of subcarrier signals.

FIG. 20 is a time chart illustrating an example of the transmission operation of the subcarrier signals SC1 to SC8 in this case. In this example, the pilot signals p1 to p8 are transmitted in an interval Tp, and the data signal Di (d1 to d8) is transmitted in an interval Tu.

The transmission controller 45a outputs the select signal SEL such that the interval Tp of the pilot signal and the interval Tu of the data signal Di arrive alternately. The transmission characteristic controller 61 performs a periodical control since the transmission characteristic controller 61 performs the transmission characteristic control only when the pilot signals are received. Therefore, it is possible to control the transmission characteristics according to environmental variations even during operation and reduce the power consumption of the reception processing circuit 200 of the receiver 20.

As described so far, the transmission apparatus 2 of the embodiment receives the multiplexed optical signal Si generated by optically modulating the transmission light LDs with the plurality of frequency-division multiplexed subcarrier signals SC1 to SC8. The transmission apparatus 2 includes the plurality of filters 50, the plurality of signal quality calculators 59, the deviation detector 60, and the transmission characteristic controller 61.

The plurality of filters 50 acquires the plurality of subcarrier signals SC1 to SC8 from the multiplexed optical signal Si. The plurality of signal quality calculators 59 calculates the signal qualities C(1) to C(8) of the plurality of subcarrier signals SC1 to SC8 acquired by the plurality of filters 50, respectively.

The deviation detector 60 detects the deviation of signal qualities (C1) to C(8) between the plurality of subcarrier signals SC1 to SC8. The transmission characteristic controller 61 controls the frequency fi of the transmission light LDs for the optical source 101 of the transmission light LDs based on the deviation of the signal qualities (C1) to C(8) detected by the deviation detector 60.

With the above-described configuration, the plurality of signal quality calculators 59 calculate the signal qualities C(1) to C(8) of the plurality of subcarrier signals SC1 to SC8, respectively, and the deviation detector 60 detects the deviation of signal qualities (C1) to C(8) between the plurality of subcarrier signals SC1 to SC8. In addition, the transmission characteristic controller 61 controls the frequency fi of the transmission light LDs for the optical source 101 of the transmitter 10 based on the deviation of signal qualities (C1) to C(8) detected by the deviation detector 60.

Accordingly, the transmission characteristic controller 61 may optimally control the spacing M between the multiplexed optical signals S1 to S4 based on the signal qualities C(1) to C(8) of the plurality of subcarrier signals SC1 to SC8. Therefore, the transmission characteristics are improved.

In addition, the transmission system of the embodiment includes the transmission apparatus 1 which transmits the multiplexed optical signal Si where the plurality of subcarrier signals SC1 to SC8 are multiplexed, and the transmission apparatus 2 which receives the multiplexed optical signal Si. The transmission apparatus 1 includes the plurality of modulators 41, the multiplexer 44, the optical source 101, and the PMs 103a to 103d.

The plurality of modulators 41 modulates the plurality of subcarrier signals SC1 to SC8, respectively. The multiplexer 44 frequency-multiplex the plurality of subcarrier signals SC1 to SC8, respectively, modulated by the plurality of modulators 41. The optical source 101 outputs the transmission light LDs. The PMs 103a to 103d generate the multiplexed optical signal Si by optically modulating the transmission light LDs of the optical source 101 with the plurality of subcarrier signals SC1 to SC8 frequency-division multiplexed by the multiplexer 44.

In addition, the transmission apparatus 2 includes the plurality of filters 50, the plurality of signal quality calculators 59, the deviation detector 60, and the transmission characteristic controller 61.

The plurality of filters 50 acquires the plurality of subcarrier signals SC1 to SC8 from the multiplexed optical signal Si. The plurality of signal quality calculators 59 calculates the signal qualities C(1) to C(8) of the plurality of subcarrier signals SC1 to SC8 acquired by the plurality of filters 50, respectively.

The deviation detector 60 detects the deviation of signal qualities C(1) to C(8) between the plurality of subcarrier signals SC1 to SC8. The transmission characteristic controller 61 controls the frequency fi of the transmission light LDs for the optical source 101 based on the deviation of signal qualities (C1) to C(8) detected by the deviation detector 60.

The transmission system according to the embodiment has the same configuration as that of the transmission apparatus 2, and therefore, has the same operation and effects as those described above.

In addition, the transmission control method of the embodiment includes the following operations.

Operation (1): receive the multiplexed optical signal Si by optically modulating the transmission light LDs with the plurality of frequency-division multiplexed subcarrier signals SC1 to SC8.

Operation (2): acquire the plurality of subcarrier signals SC1 to SC8 from the multiplexed optical signal Si.

Operation (3): calculate the signal qualities C(1) to C(8) of the plurality of acquired subcarrier signals SC1 to SC8, respectively.

Operation (4): detect the deviation of signal qualities C(1) to C(8) between the plurality of subcarrier signals SC1 to SC8.

Operation (5): control the frequency fi of the transmission light LDs for the optical source 101 of the transmission light LDs based on the detected deviation of the signal qualities C(1) to C(8).

The transmission control method according to the embodiment has the same configuration as that of the transmission apparatus 2, and therefore, has the same operation and effects as those described above.

While the foregoing embodiments are described in the present disclosure, the present disclosure is not limited to the embodiments and may be modified and practiced in various ways within a scope that does not depart from the gist of the present disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission apparatus configured to receive a plurality of frequency-division multiplexed optical signals generated by modulating carrier light based on a plurality of frequency-division multiplexed subcarrier signals, the transmission apparatus comprising:
   a memory; and
   a processor coupled to the memory and configured to:
      extract a plurality of subcarrier signals of the plurality of frequency-division multiplexed subcarrier signals from each of the plurality of frequency-division multiplexed optical signals;
      calculate signal qualities of the plurality of subcarrier signals, respectively;
      detect a deviation of the signal qualities between the plurality of subcarrier signals; and
      shift frequencies of the plurality of frequency-division multiplexed optical signals, respectively either in a positive direction or in a negative direction based on the detected deviation of the signal qualities such that intervals between the frequencies of the plurality of frequency-division multiplexed optical signals are increased or decreased within a frequency band of the plurality of frequency-division multiplexed optical signals, thereby controlling a frequency of the carrier light generated by an optical source of a transmission apparatus configured to transmit the plurality of frequency-division multiplexed optical signals, based on the deviation of the signal qualities,
   wherein, when the detected deviation of the signal qualities is a positive value, the frequencies of the plurality of frequency-division multiplexed optical signals are shifted in the positive direction, and
   when the detected deviation of the signal qualities is a negative value, the frequencies of the plurality of frequency-division multiplexed optical signals are shifted in the negative direction.

2. The transmission apparatus according to claim 1,
wherein, when the deviation of the signal qualities is not detected, the processor calculates a difference in the signal qualities between a first subcarrier signal at a central portion within the frequency band of the plurality of frequency-division multiplexed optical signals and a second subcarrier signal at an edge portion within the frequency band, the first and second subcarrier signals being among the plurality of subcarrier signals, and
wherein, when the difference is smaller than a predetermined value, the processor controls the frequency of the carrier light generated by the optical source so that an average of the signal qualities of the plurality of subcarrier signals is increased.

3. The transmission apparatus according to claim 1,
wherein the plurality of subcarrier signals are modulated by a plurality of modulators, respectively,
wherein, when the deviation of the signal qualities is not detected, the processor calculates a difference between a first signal quality of a first subcarrier signal at a central portion within a frequency band of the plurality of frequency-division multiplexed optical signals and a second signal quality of a second subcarrier signal at an edge portion within the frequency band, the first and second subcarrier signals being among the plurality of subcarrier signals, and
wherein, when the difference is smaller than a first predetermined value, the processor controls the plurality of modulators so as to decrease a multi-value level of modulation for a modulator of the plurality of modulators.

4. The transmission apparatus according to claim 3, wherein, when the difference is smaller than the first predetermined value, the processor controls the modulator corresponding to the second subcarrier signal so as to decrease the multi-value level of modulation for the modulator.

5. The transmission apparatus according to claim 4,
wherein the processor is further configured to have a table in which the signal qualities and transmission possibility/impossibility information for indicating whether transmission of the plurality of subcarrier signals is possible or impossible are recorded in association with each of the multi-value levels of modulation, and
wherein the processor acquires the transmission possibility/impossibility information corresponding to the second signal quality on the decreased multi-value level from the table, and controls the modulator corresponding to the second subcarrier signal so as to decrease the multi-value level of modulation for the modulator when the transmission possibility/impossibility information indicates possible transmission.

6. The transmission apparatus according to claim 1,
wherein the plurality of subcarrier signals are modulated by a plurality of modulators, respectively,
wherein, when the deviation of signal qualities is not detected, the processor calculates a difference between a first signal quality of a first subcarrier signal at a central portion within the frequency band of the plurality of frequency-division multiplexed optical signals and a second signal quality of a second subcarrier signal at an edge portion within the frequency band, the first and second subcarrier signals being among the plurality of subcarrier signals, and
wherein, when the difference is larger than a second predetermined value, the processor controls the plurality of modulators so as to increase a multi-value level of modulation for a modulator of the plurality of modulators.

7. The transmission apparatus according to claim 6, wherein, when the difference is larger than the second predetermined value, the processor controls the modulator corresponding to the first subcarrier signal so as to increase the multi-value level of modulation for the modulator.

8. The transmission apparatus according to claim 7,
wherein the processor is further configured to have a table in which the signal qualities and transmission possibility/impossibility information for indicating whether transmission of the plurality of subcarrier signals is possible or impossible are recorded in association for each of the multi-value levels of modulation, and
wherein the processor acquires the transmission possibility/impossibility information corresponding to the first signal quality on the increased multi-value level from the table, and controls the modulator corresponding to the first subcarrier signal so as to increase the multi-value level of modulation for the modulator when the transmission possibility/impossibility information indicates possible transmission.

9. A transmission system comprising:
a first transmission apparatus configured to transmit a plurality of frequency-division multiplexed optical signals generated by modulating carrier light based on a plurality of frequency-division multiplexed subcarrier signals,
the first transmission apparatus including:
  a first processor coupled to a first memory and configured to modulate a plurality of subcarrier signals of each of the plurality of frequency-division multiplexed optical signals, and frequency-multiplex the modulated plurality of subcarrier signals, respectively;
  an optical source configured to generate carrier light; and
  a phase modulator configured to modulate the carrier light based on the plurality of frequency-division multiplexed subcarrier signals generated by frequency-multiplexing the plurality of subcarrier signals; and
a second transmission apparatus configured to receive the plurality of frequency-division multiplexed optical signals transmitted from the first transmission apparatus,
the second transmission apparatus including a second processor coupled to a second memory and configured to:
  extract the plurality of subcarrier signals from each of the plurality of frequency-division multiplexed optical signals received;
  calculate signal qualities of the plurality of subcarrier signals, respectively;
  detect a deviation of the signal qualities between the plurality of subcarrier signals; and
  shift frequencies of the plurality of frequency-division multiplexed optical signals, respectively either in a positive direction or in a negative direction based on the detected deviation of the signal qualities such that intervals between the frequencies of the plurality of frequency-division multiplexed optical signals are increased or decreased within a frequency band of the plurality of frequency-division multiplexed optical signals, thereby controlling a frequency of the carrier light, wherein, when the detected deviation of the signal qualities is a positive value, the frequencies of the plurality of frequency-division multiplexed optical signals are shifted in the positive direction, and when the detected deviation of the signal qualities is a negative value, the frequencies of the plurality of frequency-division multiplexed optical signals are shifted in the negative direction.

10. A transmission control method comprising:

receiving a plurality of frequency-division multiplexed optical signals generated by modulating carrier light based on a plurality of frequency-division multiplexed subcarrier signals;

extracting a plurality of subcarrier signals of the plurality of frequency-division multiplexed subcarrier signals from each of the plurality of frequency-division multiplexed optical signals;

calculating signal qualities of the plurality of subcarrier signals, respectively;

detecting a deviation of the signal qualities between the plurality of subcarrier signals; and shifting frequencies of the plurality of frequency-division multiplexed optical signals, respectively either in a positive direction or in a negative direction based on the detected deviation of the signal qualities such that intervals between the frequencies of the plurality of frequency-division multiplexed optical signals are increased or decreased within a frequency band of the plurality of frequency-division multiplexed optical signals, thereby controlling a frequency of the carrier light generated by an optical source of a transmission apparatus configured to transmit the frequency-division multiplexed optical signal, based on the deviation of the signal qualities, by a processor, wherein, when the detected deviation of the signal qualities is a positive value, the frequencies of the plurality of frequency-division multiplexed optical signals are shifted in the positive direction, and when the detected deviation of the signal qualities is a negative value, the frequencies of the plurality of frequency-division multiplexed optical signals are shifted in the negative direction.

11. The transmission control method according to claim 10, wherein, when the deviation of the signal qualities is not detected, the processor calculates a difference in the signal qualities between a first subcarrier signal at a central portion within the frequency band of the plurality of frequency-division multiplexed optical signals and a second subcarrier signal at an edge portion within the frequency band, the first and second subcarrier signals being among the plurality of subcarrier signals, and wherein, when the difference is smaller than a predetermined value, the processor controls the frequency of the carrier light generated by the optical source so that an average of the signal qualities of the plurality of subcarrier signals is increased.

12. The transmission control method according to claim 10, wherein the plurality of subcarrier signals are modulated by a plurality of modulators, respectively, wherein, when the deviation of the signal qualities is not detected, the processor calculates a difference between a first signal quality of a first subcarrier signal at a central portion within the frequency band of the plurality of frequency-division multiplexed optical signals and a second signal quality of a second subcarrier signal at an edge portion within the frequency band, the first and second subcarrier signals being among the plurality of subcarrier signals, and wherein, when the difference is smaller than a first predetermined value, the processor controls the plurality of modulators so as to decrease a multi-value level of modulation for a modulator of the plurality of modulators.

13. The transmission control method according to claim 12, wherein, when the difference is smaller than the first predetermined value, the processor controls the modulator corresponding to the second subcarrier signal so as to decrease the multi-value level of modulation for the modulator.

14. The transmission control method according to claim 13, wherein the processor is further configured to have a table in which the signal qualities and transmission possibility/impossibility information for indicating whether transmission of the plurality of subcarrier signals is possible or impossible are recorded in association with each of the multi-value levels of modulation, and wherein the processor acquires the transmission possibility/impossibility information corresponding to the second signal quality on the decreased multi-value level from the table, and controls the modulator corresponding to the second subcarrier signal so as to decrease the multi-value level of modulation for the modulator when the transmission possibility/impossibility information indicates possible transmission.

15. The transmission control method according to claim 10, wherein the plurality of subcarrier signals are modulated by a plurality of modulators, respectively, and wherein, when the deviation of signal qualities is not detected, the processor calculates a difference between a first signal quality of a first subcarrier signal at a central portion within the frequency band of the plurality of frequency-division multiplexed optical signals and a second signal quality of a second subcarrier signal at an edge portion within the frequency band, the first and second subcarrier signals being among the plurality of subcarrier signals, and wherein, when the difference is larger than a second predetermined value, the processor controls the plurality of modulators so as to increase a multi-value level of modulation for a modulator of the plurality of modulators.

16. The transmission control method according to claim 15, wherein, when the difference is larger than the second predetermined value, the processor controls the modulator corresponding to the first subcarrier signal so as to increase the multi-value level of modulation for the modulator.

17. The transmission control method according to claim 16, wherein the processor is further configured to have a table in which the signal qualities and transmission possibility/impossibility information for indicating whether transmission of the plurality of subcarrier signals is possible or impossible are recorded in association for each of the multi-value levels of modulation, and wherein the processor acquires the transmission possibility/impossibility information corresponding to the first signal quality on the increased multi-value level from the table, and controls the modulator corresponding to the first subcarrier signal so as to increase the multi-value level of modulation for the modulator when the transmission possibility/impossibility information indicates possible transmission.

* * * * *